United States Patent
Tajima et al.

(10) Patent No.: US 8,190,031 B2
(45) Date of Patent: May 29, 2012

(54) OPTICAL NETWORK DESIGN APPARATUS AND DISPERSION COMPENSATION DESIGN METHOD

(75) Inventors: Kazuyuki Tajima, Kawasaki (JP); Toru Katagiri, Kawasaki (JP); Tomohiro Hashiguchi, Kawasaki (JP); Yutaka Takita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 442 days.

(21) Appl. No.: 12/620,812

(22) Filed: Nov. 18, 2009

(65) Prior Publication Data

US 2010/0215377 A1 Aug. 26, 2010

(30) Foreign Application Priority Data

Feb. 26, 2009 (JP) ................... 2009-043340

(51) Int. Cl.
*H04B 10/00* (2006.01)
(52) U.S. Cl. .......... 398/147; 398/158; 398/159; 398/81; 398/79; 398/25; 398/29; 398/45; 398/48; 398/83; 385/24; 385/37; 385/16; 385/17; 385/18
(58) Field of Classification Search .................. 398/147, 398/158, 159, 81, 79, 25, 29, 58, 59, 33, 398/38, 45, 48, 49, 50, 82, 83; 385/24, 37, 385/16, 17, 18, 123, 124
See application file for complete search history.

(56) References Cited

U.S. PATENT DOCUMENTS

| 7,359,645 B2 * | 4/2008 | Miyashita et al. ............ 398/147 |
| 2005/0226629 A1 * | 10/2005 | Ooi et al. ...................... 398/147 |
| 2005/0244164 A1 | 11/2005 | Shibata |
| 2006/0098987 A1 | 5/2006 | Hoshida |
| 2006/0193638 A1 | 8/2006 | Akiyama |

FOREIGN PATENT DOCUMENTS

| JP | 2005-006604 A | 1/2005 |
| JP | 2005-318474 A | 11/2005 |
| JP | 2006-135788 A | 5/2006 |
| WO | WO-2005/006604 | 1/2005 |

* cited by examiner

*Primary Examiner* — Hanh Phan
(74) *Attorney, Agent, or Firm* — Fujitsu Patent Center

(57) ABSTRACT

In an optical network design apparatus, a constraint setter sets a first constraint that one of alternative values given beforehand is selected as the dispersion compensation amount of each node, sets a first margin value that assumes a nonnegative value, sets a second constraint that the first margin value is equal to or greater than the difference between the residual dispersion and the lower bound of an allowable range, sets a second margin value that assumes a nonnegative value, and sets a third constraint that the second margin value is equal to or greater than the difference between the upper bound of the allowable range and the residual dispersion. A calculation controller generates an objective function including the first, second and third constraints and including a summation of the first and second margin values for all paths, and derives a solution that minimizes the objective function.

19 Claims, 20 Drawing Sheets

| Optical fiber | Dispersion amount | | | |
|---|---|---|---|---|
| | $\lambda 1$ | $\lambda 2$ | $\lambda 3$ | $\lambda 4$ |
| fiber12 | d12[$\lambda 1$] | d12[$\lambda 2$] | d12[$\lambda 3$] | d12[$\lambda 4$] |
| fiber21 | d21[$\lambda 1$] | d21[$\lambda 2$] | d21[$\lambda 3$] | d21[$\lambda 4$] |
| fiber23 | d23[$\lambda 1$] | d23[$\lambda 2$] | d23[$\lambda 3$] | d23[$\lambda 4$] |
| fiber32 | d32[$\lambda 1$] | d32[$\lambda 2$] | d32[$\lambda 3$] | d32[$\lambda 4$] |
| fiber31 | d31[$\lambda 1$] | d31[$\lambda 2$] | d31[$\lambda 3$] | d31[$\lambda 4$] |
| fiber13 | d13[$\lambda 1$] | d13[$\lambda 2$] | d13[$\lambda 3$] | d13[$\lambda 4$] |

FIG. 5

| DCM | Compensation amount (at $\lambda 0$) | | | | | |
|---|---|---|---|---|---|---|
| | Alternative 1 | Alternative 2 | Alternative 3 | Alternative 4 | Alternative 5 | Alternative 6 |
| DCM1 | c11[$\lambda 0$] | c12[$\lambda 0$] | c13[$\lambda 0$] | c14[$\lambda 0$] | | |
| DCM2 | c21[$\lambda 0$] | c22[$\lambda 0$] | c23[$\lambda 0$] | | | |
| DCM3 | c31[$\lambda 0$] | c32[$\lambda 0$] | c33[$\lambda 0$] | c34[$\lambda 0$] | c35[$\lambda 0$] | |
| DCM4 | c41[$\lambda 0$] | c42[$\lambda 0$] | c43[$\lambda 0$] | c44[$\lambda 0$] | | |
| DCM5 | c51[$\lambda 0$] | c52[$\lambda 0$] | c53[$\lambda 0$] | | | |
| DCM6 | c61[$\lambda 0$] | c62[$\lambda 0$] | c63[$\lambda 0$] | c64[$\lambda 0$] | c65[$\lambda 0$] | c66[$\lambda 0$] |

FIG. 6

| Compensation amount alternative for DCM1 | Compensation amount | | | |
|---|---|---|---|---|
| | $\lambda 1$ | $\lambda 2$ | $\lambda 3$ | $\lambda 4$ |
| Alternative 1 | c11[$\lambda 1$] | c11[$\lambda 2$] | c11[$\lambda 3$] | c11[$\lambda 4$] |
| Alternative 2 | c12[$\lambda 1$] | c12[$\lambda 2$] | c12[$\lambda 3$] | c12[$\lambda 4$] |
| Alternative 3 | c13[$\lambda 1$] | c13[$\lambda 2$] | c13[$\lambda 3$] | c13[$\lambda 4$] |
| Alternative 4 | c14[$\lambda 1$] | c14[$\lambda 2$] | c14[$\lambda 3$] | c14[$\lambda 4$] |

FIG. 7

| |
|---|
| p1: G=1 n1→n2 |
| p2: G=2 n2→n1 |
| p3: G=3 n2→n3 |
| p4: G=4 n3→n2 |
| p5: G=5 n3→n1 |
| p6: G=6 n1→n3 |
| p7: G=7 n1→n2→n3 |
| p8: G=8 n3→n2→n1 |
| p9: G=9 n2→n3→n1 |
| p10: G=10 n1→n3→n2 |
| p11: G=11 n3→n1→n2 |
| p12: G=12 n2→n1→n3 |

FIG. 8

| Path | Upper bound of allowable range | Lower bound of allowable range |
|---|---|---|
| Path p1 | UpperBound[1] | LowerBound[1] |
| Path p2 | UpperBound[2] | LowerBound[2] |
| Path p3 | UpperBound[3] | LowerBound[3] |
| Path p4 | UpperBound[4] | LowerBound[4] |
| Path p5 | UpperBound[5] | LowerBound[5] |
| Path p6 | UpperBound[6] | LowerBound[6] |
| Path p7 | UpperBound[7] | LowerBound[7] |
| Path p8 | UpperBound[8] | LowerBound[8] |
| Path p9 | UpperBound[9] | LowerBound[9] |
| Path p10 | UpperBound[10] | LowerBound[10] |
| Path p11 | UpperBound[11] | LowerBound[11] |
| Path p12 | UpperBound[12] | LowerBound[12] |

FIG. 10

| DCM | Alternative for compensation amount | Value i | Value k | x[i, k] |
|---|---|---|---|---|
| DCM1 | Alternative 1 | 1 | 1 | x[1, 1] |
| | Alternative 2 | 1 | 2 | x[1, 2] |
| | Alternative 3 | 1 | 3 | x[1, 3] |
| | Alternative 4 | 1 | 4 | x[1, 4] |
| DCM2 | Alternative 1 | 2 | 1 | x[2, 1] |
| | Alternative 2 | 2 | 2 | x[2, 2] |
| | Alternative 3 | 2 | 3 | x[2, 3] |
| DCM3 | Alternative 1 | 3 | 1 | x[3, 1] |
| | Alternative 2 | 3 | 2 | x[3, 2] |
| | Alternative 3 | 3 | 3 | x[3, 3] |
| | Alternative 4 | 3 | 4 | x[3, 4] |
| | Alternative 5 | 3 | 5 | x[3, 5] |
| DCM4 | Alternative 1 | 4 | 1 | x[4, 1] |
| | Alternative 2 | 4 | 2 | x[4, 2] |
| | Alternative 3 | 4 | 3 | x[4, 3] |
| | Alternative 4 | 4 | 4 | x[4, 4] |
| DCM5 | Alternative 1 | 5 | 1 | x[5, 1] |
| | Alternative 2 | 5 | 2 | x[5, 2] |
| DCM6 | Alternative 1 | 6 | 1 | x[6, 1] |
| | Alternative 2 | 6 | 2 | x[6, 2] |
| | Alternative 3 | 6 | 3 | x[6, 3] |
| | Alternative 4 | 6 | 4 | x[6, 4] |
| | Alternative 5 | 6 | 5 | x[6, 5] |
| | Alternative 6 | 6 | 6 | x[6, 6] |

FIG. 11

| Value x[1,1] | Value x[1,2] | Value x[1,3] | Value x[1,4] | Value dcm1 |
|---|---|---|---|---|
| 1 | 0 | 0 | 0 | $c11[\lambda 0]$ |
| 0 | 1 | 0 | 0 | $c12[\lambda 0]$ |
| 0 | 0 | 1 | 0 | $c13[\lambda 0]$ |
| 0 | 0 | 0 | 1 | $c14[\lambda 0]$ |

FIG. 12

|  | Compensation amount of dispersion compensation module 20 | | |
| --- | --- | --- | --- |
|  | Value V1 | Value V2 | Value V3 |
| No. of available wavelength channels of path P1 | 6 wavelength channels | 30 wavelength channels | All wavelength channels |
| No. of available wavelength channels of path P2 | All wavelength channels | 30 wavelength channels | 9 wavelength channels |

FIG. 16

OPTICAL NETWORK DESIGN APPARATUS AND DISPERSION COMPENSATION DESIGN METHOD

CROSS-REFERENCE TO RELATED APPLICATION

This application is based upon and claims the benefit of priority of the prior Japanese Patent Application No. 2009-043340, filed on Feb. 26, 2009, the entire contents of which are incorporated herein by reference.

FIELD

The embodiments discussed herein are related to optical network design apparatus and dispersion compensation design methods for designing dispersion compensation of optical networks.

BACKGROUND

As a result of the recent rapid increase in network traffic, WDM (Wavelength Division Multiplexing) technology capable of transmitting large volumes of information has come to be widely used. Also, to meet requirements such as reduction in cost, there has been a demand for all-optical transmission over long distances without the conversion to electricity in the middle.

Meanwhile, in an optical fiber used for optical transmission, the velocity of light varies depending on the wavelength, so that a phenomenon called chromatic dispersion occurs in which optical wavelengths emitted simultaneously from the transmitting end arrive at the receiving end at different times. Chromatic dispersion leads to distortion of the received waveforms, and if the distortion caused is too large, the conveyed information fails to be accurately discriminated.

Thus, optical signals propagated through an optical fiber are passed through a DCM (Dispersion Compensation Module) having chromatic dispersion characteristics opposite in sign, to compensate the chromatic dispersion. This makes it possible to transmit optical signals over a long distance while restraining the waveform distortion.

However, the amount of chromatic dispersion increases in proportion to the transmission distance, and also different types of optical fibers have different dispersion characteristics. Accordingly, dispersion compensation modules with different dispersion compensation characteristics are needed for different transmission distances and for different types of optical fibers.

Generally, the dispersion compensation module is constituted by a passive component such as an optical fiber, and thus it is very often the case that a single variety of dispersion compensation module has a fixed dispersion compensation characteristic. It is therefore necessary to determine in advance the locations on an optical network where individual dispersion compensation modules with certain dispersion compensation characteristics are to be arranged.

Determining the locations of individual dispersion compensation modules with certain dispersion compensation characteristics on an optical network in this manner is referred to as layout design (dispersion compensation design) for the dispersion compensation modules on the optical network.

In WDM communications, on the other hand, multiplexed transmission is performed using a plurality of different wavelengths. The necessary amount of dispersion compensation varies depending on the wavelength channel because of the chromatic dispersion, and therefore, when carrying out the dispersion compensation design, it is necessary that the chromatic dispersion of an optical transmission line be compensated over the wavelength range used, that is, the range from the longest wavelength channel through to the shortest wavelength channel.

It is, however, difficult to compensate the chromatic dispersion of an optical transmission line over a wide wavelength range by means of a single dispersion compensation module. Namely, the extent to which the chromatic dispersion is compensated varies from one wavelength channel to another, with the result that some wavelength channels are undercompensated while others are overcompensated.

If residual chromatic dispersion that failed to be compensated falls within an certain range, a transmission device can correctly receive information. In practice, therefore, the dispersion compensation is designed such that the residual chromatic dispersion of all wavelength channels that failed to be compensated falls within an allowable chromatic dispersion range. As conventional dispersion compensation design techniques, a technique has been proposed in which the amount of dispersion compensation is set so that the residual dispersion may fall within an allowable residual dispersion range (cf. Domestic re-publication of PCT international application No. 2005/006604 (page 6, line 46 to page 8, line 26, FIG. 6)).

With respect to a path which is routed from the start to the end point of optical transmission over a WDM optical network, the dispersion compensation is ordinarily designed such that the residual dispersion (remaining dispersion that failed to be compensated by dispersion compensation modules) of a specified path falls within an allowable range.

FIG. 18 illustrates a path on an optical network. The path p1 starts from a node n1 and terminates at a node n4 and is routed from the node n1 to the node n4 via nodes n2 and n3. In the case of a system in which a dispersion compensation module is arranged at the receiving end, dispersion compensation modules are arranged in the respective nodes n2, n3 and n4 (in this instance, a dispersion compensation module is arranged in each of the nodes n2, n3 and n4, though, in practice, it is unnecessary to provide each receiving end with a dispersion compensation module).

The dispersion compensation module arranged in the node n2 compensates the chromatic dispersion caused on an optical fiber f1. The dispersion compensation module arranged in the node n3 compensates the chromatic dispersion caused on an optical fiber f2, and the dispersion compensation module arranged in the node n4 compensates the chromatic dispersion caused on an optical fiber f3.

To obtain the amount of chromatic dispersion (residual dispersion) at the end point of a certain path, the chromatic dispersions of the individual optical fibers from the start to the end point of the path are added up, then the chromatic dispersions of the individual dispersion compensation modules on the path are added up, and the sums obtained are added together, thereby obtaining the residual dispersion at the end point of the path.

In the case of the path p1, for example, the chromatic dispersions of the optical fibers f1 to f3 from the start point to the end point are added up, then the chromatic dispersions of the dispersion compensation modules arranged in the nodes n2, n3 and n4 are added up, and the obtained sums are added together.

Namely, the sum total of the chromatic dispersion amount of the optical fiber f1, the chromatic dispersion amount of the dispersion compensation module arranged in the node n2, the chromatic dispersion amount of the optical fiber f2, the chromatic dispersion amount of the dispersion compensation module arranged in the node n3, the chromatic dispersion amount of the optical fiber f3 and the chromatic dispersion amount of the dispersion compensation module arranged in the node n4 corresponds to the amount of chromatic dispersion at the end point (node n4) of the path p1, namely, the residual dispersion of the path p1.

When designing the dispersion compensation, the residual dispersion is calculated in the aforementioned manner with respect to each of specified paths input to a dispersion compensation design tool, and how dispersion compensation modules with respective dispersion compensation characteristics are to be laid out within an optical network is determined such that the residual dispersion falls within the allowable range.

Making the residual dispersion fall within the allowable range means causing the residual dispersion to fall within the range defined by desired upper and lower bounds (upper- and lower-bound dispersion values) at the end point. If the upper bound is exceeded by the residual dispersion, then the wavelength is undercompensated, and if the residual dispersion is smaller than the lower bound, the wavelength is overcompensated.

Also, when calculating the residual dispersion in the manner stated above, conventionally the calculation is performed only with respect to a single reference wavelength, among multiple wavelengths multiplexed on a WDM signal. For example, where there are 40 different wavelengths $\lambda 1$ to $\lambda 40$ to be multiplexed, the residual dispersion is calculated using a center wavelength $\lambda 20$ or a common wavelength 1550 nm as the reference wavelength.

Conventionally, moreover, a fixed-value dispersion variation range (hereinafter referred to as fixed variation range) is set which is estimated from the calculated residual dispersion of the reference wavelength to include the residual dispersions of other wavelengths than the reference wavelength, and the dispersion compensation is designed such that the fixed variation range falls within an allowable range.

FIG. 19 illustrates a dispersion map (transition of cumulative dispersion with distance) of the path p1 depicted in FIG. 18, wherein the horizontal axis indicates distance and the vertical axis indicates dispersion amount.

It is assumed that a WDM signal on which 40 wavelength channels $\lambda 1$ to $\lambda 40$ are multiplexed is transmitted along the path p1, and that the reference wavelength with respect to which the residual dispersion is calculated is $\lambda k$. It is also assumed that the residual dispersion of the reference wavelength $\lambda k$ at the node n4 is calculated to be rk, and that the residual dispersions of the shortest and longest wavelengths $\lambda 1$ and $\lambda 40$ at the node n4 are calculated to be r1 and r40, respectively.

A fixed variation range B is estimated which contains the variation range of the residual dispersion rk plus margins, and the dispersion compensation is designed such that the fixed variation range B falls within the allowable range (between the upper and lower bounds).

If the fixed variation range B is within the allowable range, the path is judged to be capable of transmission, and if the fixed variation range B is outside the allowable range, the path is judged to be incapable of transmission. Also, the compensation values and locations of dispersion compensation modules are determined so that the number of paths capable of transmission may be maximized.

In the case illustrated in FIG. 19, the residual dispersion rk of the reference wavelength $\lambda k$ as well as the residual dispersions r1 and r40 of the shortest and longest wavelengths $\lambda 1$ and $\lambda 40$ are included in the fixed variation range B, and also the fixed variation range B falls within the allowable range.

Consequently, the path p1 is judged to be capable of transmitting a 40-wavelength WDM signal.

The fixed variation range B is, however, no more than an estimated value based on the single reference wavelength. Since, in practice, the variation ranges of the individual wavelengths vary depending on the dispersion compensation amounts and characteristics of the dispersion compensation modules, there is no guarantee that the variation ranges of all wavelengths will certainly fall within the estimated fixed variation range B in a real optical network.

FIG. 20 illustrates a dispersion map, wherein the horizontal axis indicates distance and the vertical axis indicates dispersion amount. A variation range b at the node n4 indicates an actual variation range of the reference wavelength, and as illustrated, the variation range b is shifted toward the upper bound and falls outside the fixed variation range B. In this case, the residual dispersion r1 of the wavelength $\lambda 1$ possibly exceeds the upper bound.

Thus, with the conventional method, it is not possible to determine with accuracy whether the dispersions of the individual wavelength channels certainly fall within the allowable range, and in some cases, the actual variation ranges of certain wavelengths fall outside the estimated fixed variation range B, in which case an erroneous judgment may possibly be made that the path is capable of transmission, though it is actually not.

To optimally design the dispersion compensation, it is desirable that the residual dispersion variation ranges of the individual wavelengths be minimized. According to the conventional dispersion compensation design described above, however, variation of the chromatic dispersion is obtained on the basis of the single reference wavelength, and dispersion variations of the other wavelengths are estimated to fall within the fixed variation range which is so set as to include the dispersion variation of the reference wavelength plus margins. Thus, with the conventional techniques, it is not possible to carry out optimum design in such a manner that actual chromatic dispersion variations of the individual wavelengths are minimized.

SUMMARY

According to one aspect of the present invention, an optical network design apparatus for designing dispersion compensation of an optical network includes a constraint setter configured to set constraints, and a calculation controller configured to derive an optimal solution of an objective function including the constraints, and determine, with respect to each of nodes, a dispersion compensation amount specified by the derived solution, as the dispersion compensation amount of a dispersion compensation module to be arranged in the corresponding node, wherein the constraint setter sets a first constraint that one of multiple alternative values given beforehand is selected as the dispersion compensation amount of each of the nodes, the constraint setter sets, with respect to each of paths, a first margin value that assumes a nonnegative value, and then sets, with respect to all wavelengths of each of the paths, a second constraint that the first margin value is equal to or greater than a difference obtained by subtracting a lower bound of an allowable residual dispersion range from a residual dispersion at an end point of the path, the constraint setter sets, with respect to each of the paths, a second margin value that assumes a nonnegative value, and then sets, with respect to all of the wavelengths of each of the paths, a third constraint that the second margin value is equal to or greater than a difference obtained by subtracting the residual dispersion from an upper bound of the allowable residual dispersion range at the end point of the path, and the calculation controller generates the objective function which includes the first, second and third constraints and which includes a summation of the first and second margin values for all of the paths, and derives the solution that minimizes the objective function.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 5 illustrates dispersion amounts of optical fibers;

FIG. 6 illustrates alternative values for the compensation amounts of respective dispersion compensation modules;

FIG. 7 illustrates compensation amounts obtained by the respective compensation amount alternative values for a dispersion compensation module with respect to individual wavelengths;

FIG. 8 illustrates paths in individual routing directions;

FIG. 10 illustrates upper and lower bounds of allowable ranges;

FIG. 11 illustrates the correspondence relationship between the compensation amount alternatives for the dispersion compensation modules and variables;

FIG. 12 illustrates alternatives for a first constraint;

FIG. 16 illustrates alternatives for the dispersion compensation amount of a dispersion compensation module;

DESCRIPTION OF EMBODIMENT(S)

Figure 1:
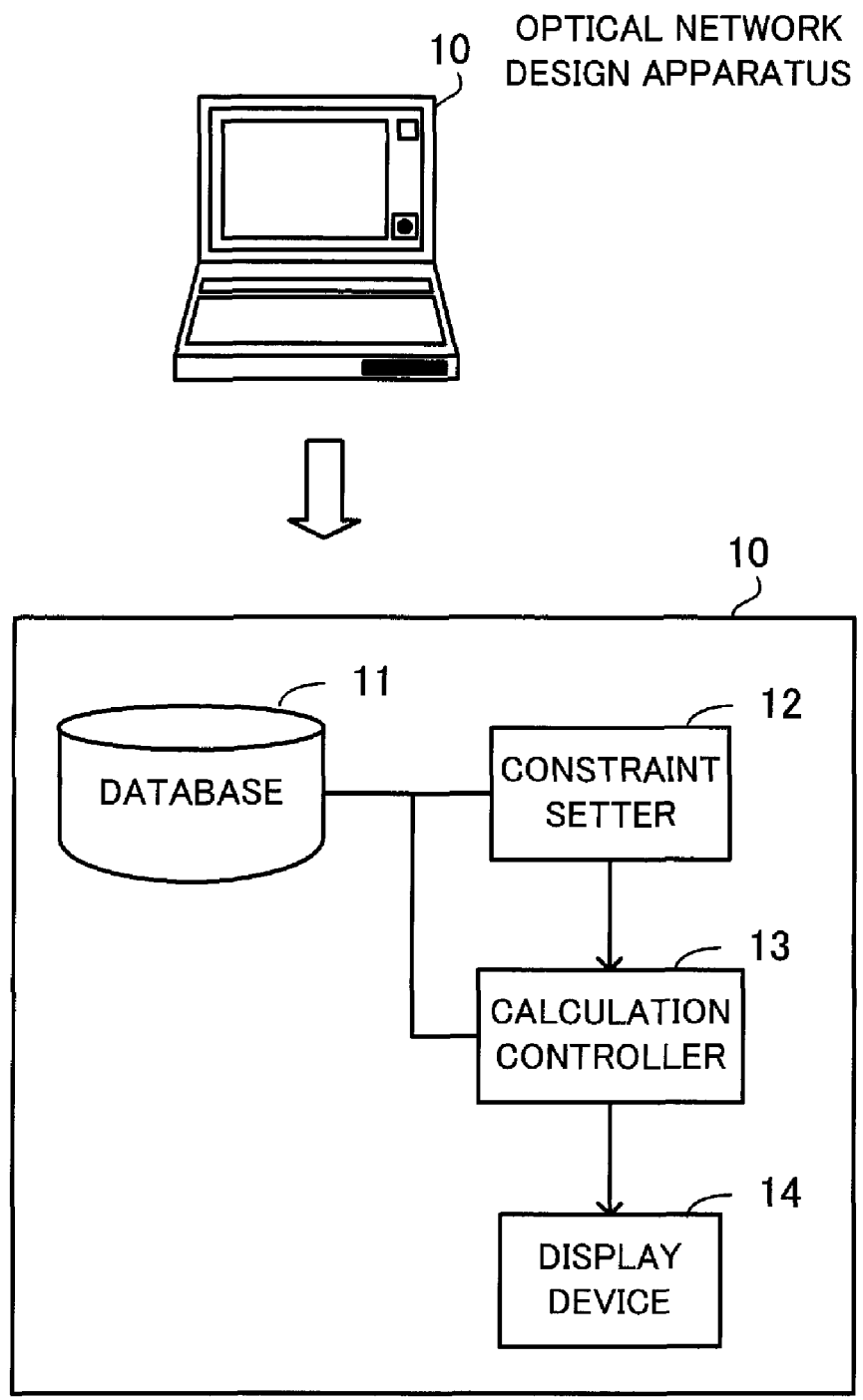
FIG. 1 illustrates an exemplary configuration of an optical network design apparatus.

Embodiments of the present invention will be described below with reference to the accompanying drawings, wherein like reference numerals refer to like elements throughout. FIG. 1 illustrates an exemplary configuration of an optical network design apparatus. The optical network design apparatus 10 comprises a database 11, a constraint setter 12, a calculation controller 13, and a display device 14. The optical network design apparatus 10 is a computer device equipped with user interfaces and configured to design dispersion compensation.

The database 11 stores optical network information needed at the time of designing dispersion compensation. The constraint setter 12 sets constraints for an optimization problem (problem of analyzing a state wherein the value of a certain function (objective function) is minimized or maximized).

The calculation controller 13 derives an optimal solution of the objective function including the constraints. Then, the calculation controller 13 determines, with respect to each node, a dispersion compensation amount specified by the derived solution, as the dispersion compensation amount of a dispersion compensation module to be arranged in the corresponding node. The display device 14 has a graphic user interface function and displays input information necessary for dispersion compensation design as well as dispersion compensation design results.

The constraint setter 12 sets a first constraint that one of multiple alternative values given beforehand is selected as the dispersion compensation amount of each node.

Also, the constraint setter 12 sets, with respect to each path, a first margin value that assumes a nonnegative value, and then sets, with respect to all wavelengths of each path, a second constraint that the first margin value is equal to or greater than the difference obtained by subtracting the lower bound of an allowable residual dispersion range from the residual dispersion at the end point of the path.

Further, the constraint setter 12 sets, with respect to each path, a second margin value that assumes a nonnegative value, and then sets, with respect to all wavelengths of each path, a third constraint that the second margin value is equal to or greater than the difference obtained by subtracting the residual dispersion from the upper bound of the allowable residual dispersion range at the end point of the path.

The calculation controller 13 generates the objective function including the first, second and third constraints and including a summation of the first and second margin values for all paths, and derives a solution that minimizes the objective function (the mathematical expressions of the constraints and objective function will be described later).

The optical network information input to the database 11 will be now described. The optical network information input to the database 11 includes, for example, path routing information, information on the chromatic dispersion characteristics of individual optical fibers, a list of dispersion compensation modules, information on the chromatic dispersion characteristics of the individual dispersion compensation modules, and upper- and lower-bound values defining allowable ranges for residual dispersions at the end points of individual paths.

Figure 2:
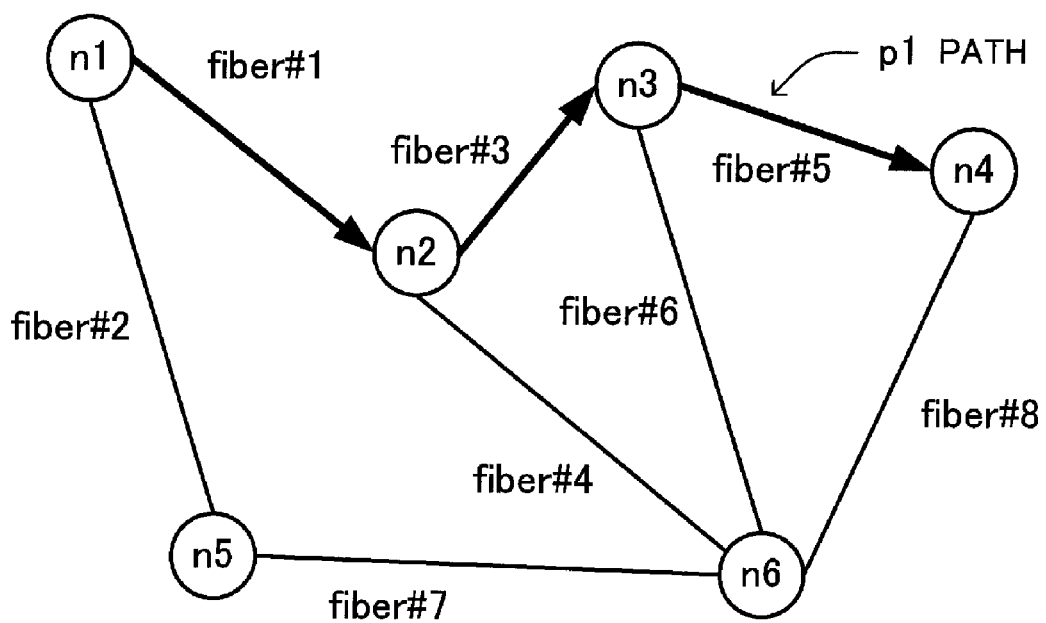
FIG. 2 illustrates path routing information.

The path routing information is expressed, for example, as an ordered list of nodes and optical fibers on the route from the start point to the end point of the path. FIG. 2 illustrates such path routing information, wherein an optical network topology with names assigned to respective optical fibers is illustrated. In the case of a path p1, the path routing information is defined as: n1, fiber#1, n2, fiber#3, n3, fiber#5, n4. If there is a path in the opposite direction, that is, a path starting from n4 and terminating at n1, the inversely ordered list—n4, fiber#5, n3, fiber#3, n2, fiber#1, n1—is registered as the path routing information.

The information on the chromatic dispersion characteristics of the individual optical fibers includes, for example, the amounts of chromatic dispersion of a reference wavelength and the amounts of change in chromatic dispersion with respect to change in wavelength (chromatic dispersion amounts with dispersion coefficients of the first, second, ..., nth degrees).

The list of dispersion compensation modules is input for each of the optical fibers. For example, the node n2 illustrated in FIG. 2 is connected with optical fibers fiber#1, fiber#3, and fiber#4. With respect to the node n2, therefore, a list of dispersion compensation modules to be inserted in the receiving end of fiber#1, a list of dispersion compensation modules to be inserted in the receiving end of fiber#3 (the receiving end where an optical signal propagated from the node n3 to the node n2 is received) and a list of dispersion compensation modules to be inserted in the receiving end of fiber#4 are entered.

Also, the information on the chromatic dispersion characteristics of the individual dispersion compensation modules is input. The chromatic dispersion characteristics information of each dispersion compensation module is identical with a parameter indicating the chromatic dispersion characteristics of an optical fiber. There is no particular order in which the respective items of the optical network information are to be input.

The constraints set by the constraint setter 12 will be now explained. Let it be assumed that the identification number of the dispersion compensation module arranged in a node of the optical network is i, and that the number of alternative values for the dispersion compensation amount of the dispersion compensation module is k, where k=1, ..., j (j is a natural number). In this case, for all i's, the first constraint is set as follows:

$$\sum_{k=1}^{j} x[i, k] = 1 \quad (1)$$

Also, let it be assumed that the identification number of the path is G, that the wavelength is $\lambda$, that the residual dispersion at the end point of the path G is rd[G,$\lambda$], that the lower bound of the allowable range for the path G is LowerBound[G], and that the first margin value is b1[G]. In this case, for all wavelengths and all paths, the second constraint is set as follows:

$$rd[G,\lambda]-\text{LowerBound}[G] \leq b1[G] \text{ for } {}^{\forall}\lambda, {}^{\forall}G \quad (2a)$$

$$b1[G] \geq 0 \quad (2b)$$

Further, let it be assumed that the identification number of the path is G, that the wavelength is $\lambda$, that the residual dispersion at the end point of the path G is rd[G,$\lambda$], that the upper bound of the allowable range for the path G is UpperBound[G], and that the second margin value is b2[G]. In this case, for all wavelengths and all paths, the third constraint is set as follows:

$$\text{UpperBound}[G]-rd[G,\lambda] \geq b2[G] \text{ for } {}^{\forall}\lambda, {}^{\forall}G \quad (3a)$$

$$b2[G] \geq 0 \quad (3b)$$

In this instance, the constraint setter 12 is configured to set the above three constraints, but additional constraints may be set when needed.

The objective function generated by the calculation controller 13 will be now explained. Given G=1, ..., h (h is a natural number), the calculation controller 13 generates the following objective function z:

$$z = \sum_{G=1}^{h} (b1[G] + b2[G]) \quad (4)$$

Then, the calculation controller 13 derives a solution that minimizes the objective function z including the constraints. In this instance, a mixed integer programming problem having the above constraints and the objective function z is solved (the mixed integer programming is a mathematical programming method employed as an optimization technique for minimizing or maximizing an objective function under given constraints).

By solving the mixed integer programming problem, the value x[i,k] in the expression (1) is determined. The value x[i,k] invariably assumes either "0" or "1", and among {x[i,k] (k=1, ..., j)}, only one k assumes the value "1" while all the other k's assume the value "0".

This means that, from among the multiple alternative values which the dispersion compensation module i can assume as the dispersion compensation amount, a single dispersion compensation amount (dispersion compensation amount ck) is determined. The dispersion compensation amount ck corresponding to x[i,k] of which the value is "1" is determined as the dispersion compensation amount of the dispersion compensation module to be arranged in the node at the receiving end of fiber#i.

Further, information indicating which wavelengths are available is output. In this case, if there is a wavelength $\lambda$ satisfying both of the following expressions (5a) and (5b):

$$rd[G,\lambda] \leq \text{UpperBound}[G] \quad (5a)$$

$$rd[G,\lambda] \geq \text{LowerBound}[G] \quad (5b)$$

it is judged that the path G can make use of the wavelength $\lambda$. The calculation results are displayed on the screen of the display device 14 whenever necessary.

Figure 3:
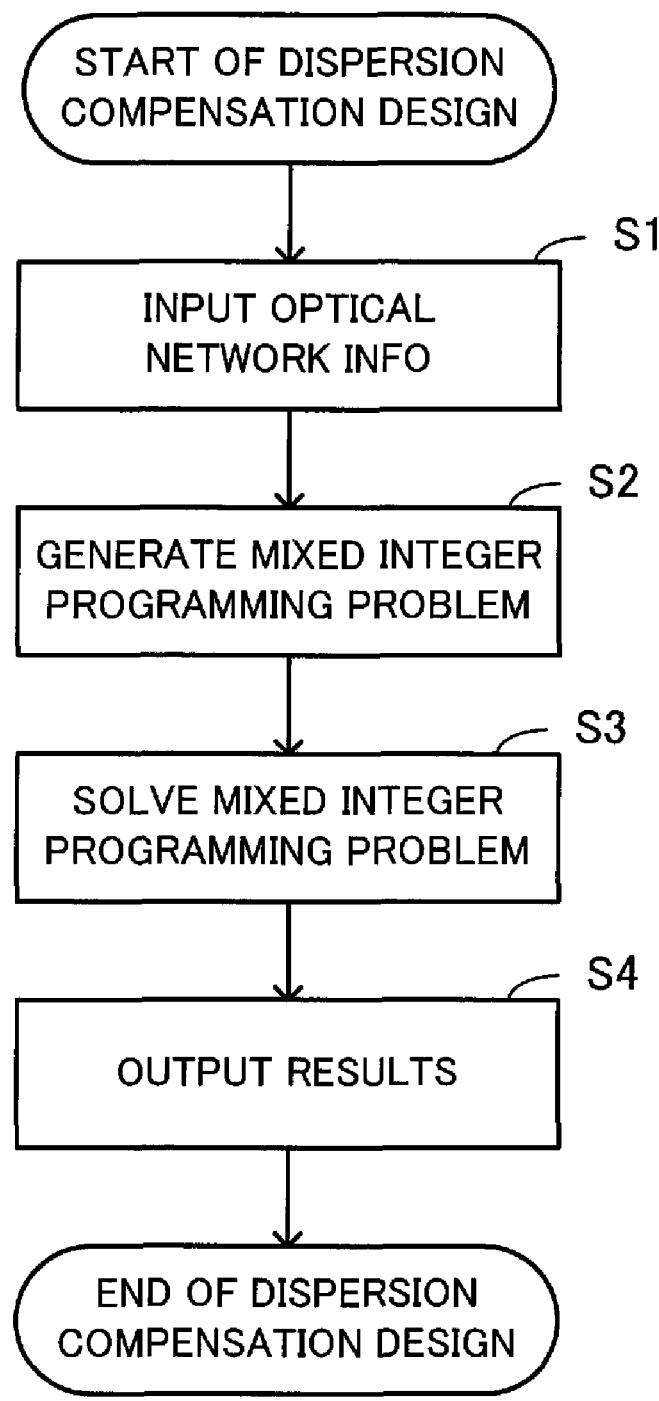
FIG. 3 illustrates an overall operational flow of the optical network design apparatus.

FIG. 3 illustrates an overall operational flow of the optical network design apparatus 10.

S1: The optical network information necessary for the dispersion compensation design is input to the database 11.

S2: The mixed integer programming problem including the first to third constraints and the objective function is generated.

S3: The mixed integer programming problem is solved (a minimal solution of the objective function is derived).

S4: The results are displayed.

The operational process of the optical network design apparatus 10 from the setting of the constraints to the derivation of the objective function will be now described in detail with reference to an exemplary optical network. The information included in various tables explained below is stored in the database 11 as the optical network information.

Figure 4:
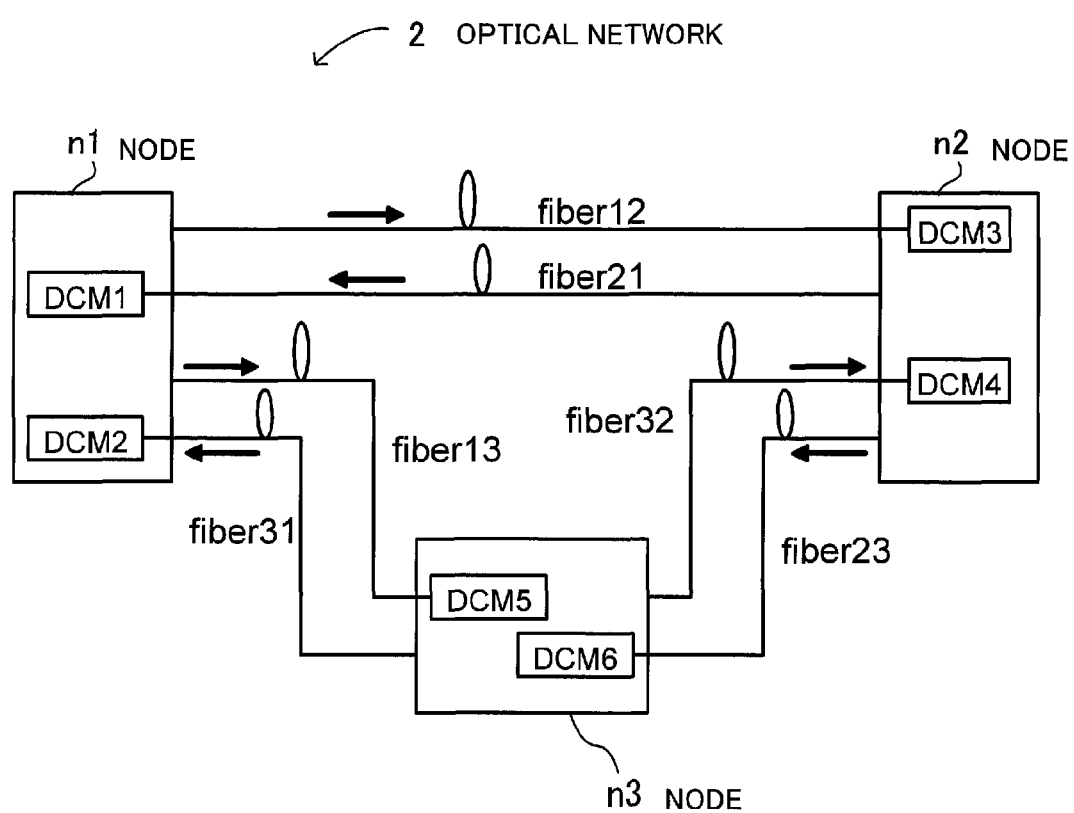
FIG. 4 illustrates an exemplary configuration of an optical network.

FIG. 4 illustrates an exemplary configuration of an optical network, wherein three nodes are connected in the form of a ring. The optical network 2 includes nodes n1 to n3, and optical fibers are laid in both directions to allow two-way communication.

The optical fiber from the node n1 to the node n2 is referred to as fiber12, and the optical fiber from the node n2 to the node n1 is referred to as fiber21. Similarly, the optical fiber from the node n2 to the node n3 is referred to as fiber23, the optical fiber from the node n3 to the node n2 as fiber32, the optical fiber from the node n3 to the node n1 as fiber31, and the optical fiber from the node n1 to the node n3 as fiber13.

"DCM" denotes a dispersion compensation module (in the following, the dispersion compensation module will be referred to also as DCM), and the DCM is arranged at the receiving side of each node. In the case of fiber12, for example, the receiving end is the node n2, and therefore, DCM3 is arranged in the node n2 and connected to the receiving end of fiber12.

Likewise, fiber21 is associated with DCM1, fiber23 with DCM6, fiber32 with DCM4, fiber31 with DCM2, and fiber13 with DCM5. Also, the wavelength channels used are $\lambda 0$, $\lambda 1$, λ2, λ3 and λ4, and λ0 is used as the reference wavelength (λ0 has a wavelength of, e.g., 1550 nm).

The amount of chromatic dispersion will be now explained. The dispersion d(λ1) of the wavelength λ 1 can be calculated according to the following expression (6):

$$d(\lambda 1) = \{d_0 + d_1(\lambda 1 - \lambda 0) + d_2(\lambda 1 - \lambda 0)^2 + d_3(\lambda 1 - \lambda 0)^3\} \times \text{length} \quad (6)$$

The expression (6) is used to calculate the dispersion of λ1, but by replacing λ1 in the expression by λ2, it is possible to obtain the dispersion amount of λ2. Also, the part in the braces "{ }" on the right-hand side of the expression (6) represents a dispersion amount per unit length, and this dispersion amount is multiplied by the length of the corresponding optical fiber, whereby the dispersion amount of the corresponding optical fiber is obtained. In the expression (6), $d_0$, $d_1$, $d_2$ and $d_3$ are dispersion coefficients of the zero, first, second and third degrees, respectively.

Once the optical fiber to be used is determined, its fixed dispersion amount is found, and therefore, the dispersion amounts of the respective optical fibers are calculated beforehand. FIG. 5 illustrates the dispersion amounts of the individual optical fibers. In the table, the dispersion amount of fiber23 with respect to λ2, for example, can be found by locating the place where the "fiber23" row crosses the "λ2" column, and therefore, is d23[λ2].

Subsequently, alternatives for the compensation amounts of DCM1, DCM2, DCM3, DCM4, DCM5 and DCM6, respectively, are derived. Since the dispersion compensation module is very often constituted by an optical fiber, it is assumed here that the dispersion compensation modules constituted by optical fibers are used. To calculate the dispersion amounts of the optical fibers, the expression (6) can be used, though different values are used for the respective dispersion coefficients $d_0$, $d_1$, $d_2$ and $d_3$.

The dispersion amount of the optical fiber forming the optical transmission line and the dispersion amount of the optical fiber used in the dispersion compensation module are opposite in sign, and therefore, when summed up, the former and the latter cancel out each other, so that the dispersion is compensated.

FIG. 6 illustrates the alternative values for the compensation amounts of the respective dispersion compensation modules. The number of the alternatives for the dispersion compensation amount varies from one dispersion compensation module to another. In the case illustrated in FIG. 6, four alternative values are set for DCM1, while three alternative values are set for DCM2. In the table, the dispersion compensation amount is indicated as cik[λ]. For example, an alternative 2 for the dispersion compensation amount of DCM1 with respect to λ0 is described as c12[λ0].

The compensation amounts of the dispersion compensation module with respect to the reference wavelength λ0 as well as the other wavelengths are determined as soon as the dispersion compensation module to be used is selected, and therefore, the compensation amounts of the individual wavelengths are also obtained beforehand. FIG. 7 illustrates the compensation amounts obtained by the respective compensation amount alternatives for DCM1 with respect to the individual wavelengths. The compensation amounts of the other dispersion compensation modules can be expressed in like manner but are not illustrated.

Paths will be now explained. Although, in practice, only those spans of the optical network 2 which are in demand are used as paths, it is assumed here that all paths are used. In the illustrated exemplary topology, the optical network 2 has three nodes n1 to n3, and accordingly, the number of combinations of path end points is three. However, paths opposite in the transmission direction, that is, the path from the node n1 to the node n2 and the path from the node n2 to the node n1, for example, are reckoned as different paths.

Also, since the topology used is a ring, there are two paths that start, for example, from the node n1 and terminate at the node n2, namely, a path routed in the clockwise direction from the node n1 to the node n2, and a path routed in the counterclockwise direction from the node n1 to the node n2 via the node n3. Thus, the paths can be listed as illustrated in FIG. 8.

FIG. 8 indicates the paths routed in the individual directions. Symbol "G" represents a path identification number used in the calculation. In FIG. 8, a path p7, for example, is assigned the value "7" as the path identification number G and indicates a path that starts from the node n1, passes through the node n2, and terminates at the node n3.

Figure 9:
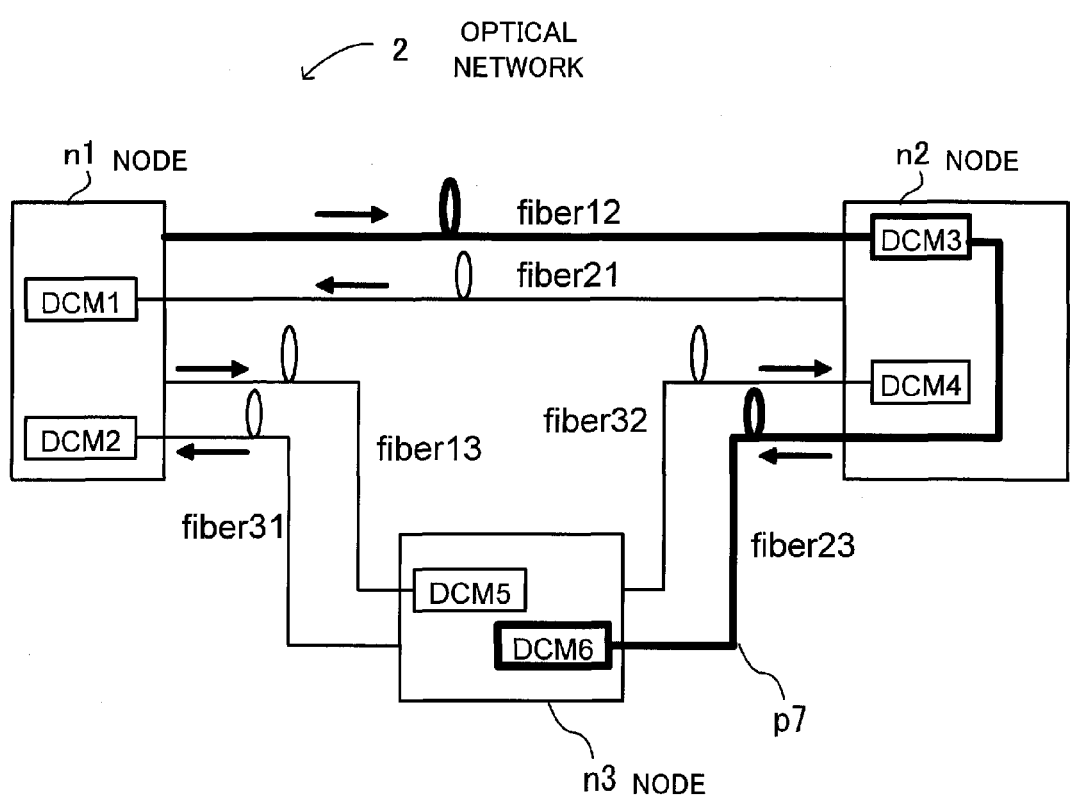
FIG. 9 illustrates a path of the optical network.

FIG. 9 illustrates the paths of the optical network 2. In the optical network 2 illustrated in FIG. 9, the path p7 with the identification number G=7 is indicated by the heavy line. In the node n2, the line connecting DCM3 to fiber23 indicates that the path p7 passes through DCM3 and leads to fiber23.

In practice, the node n2 includes not only the dispersion compensation module but other devices such as an optical amplifier and an optical switch, and these devices are inserted in the path section connecting fiber12 to fiber23. Since the dispersion compensation module alone needs to be explained here, however, the other devices are omitted and the path is illustrated in such a manner as to pass through DCM3 and connect directly to fiber23. As seen from FIG. 9, the path p7 passes through fiber12, DCM3, fiber23, and DCM6.

Then, with respect to each path, upper and lower bounds defining an allowable range for the dispersion amount at the end point of the path are input. FIG. 10 indicates the upper and lower bounds of the respective allowable ranges. The upper and lower bounds of the allowable range for the path p7, for example, are UpperBound[7] and LowerBound[7], respectively.

In the following, x[i,k] used in the first constraint will be explained. The value x[i,k] is an integer variable that assumes "0" or "1", and is derived by the mixed integer programming. The number of the variables is equal to the number of alternatives for each corresponding dispersion compensation amount.

FIG. 11 illustrates the correspondence relationship between the alternatives for the compensation amounts of the respective DCMs and the variables. For example, the variable corresponding to the alternative 1 for DCM1 is x[1,1], and if x[1,1]=1, the dispersion compensation value c11 of the alternative 1, indicated in the table of FIG. 7, is determined as the compensation amount of DCM1. Provided the compensation amount of DCM1 (at λ0) is dcm1, dcm1 can be expressed by the following mathematical expression (7) using the variables:

$$dcm1 = c11[\lambda 0] \times [1,1] + c12[\lambda 0] \times [1,2] + c13[\lambda 0] \times [1,3] + c14[\lambda 0] \times [1,4] \quad (7)$$

However, if no constraint is set on the expression (7), then a plurality of combinations of the compensation amount alternatives are possible. Namely, one dispersion compensation amount needs to be set with respect to a single dispersion compensation module, but if no constraint is set on the expression (7), a plurality of dispersion compensation amounts can be set for the single dispersion compensation module. Thus, the first constraint is set so as to allow only one dispersion compensation amount to be selected.

Among the combinations of the values x[1,1], x[1,2], x[1,3] and x[1,4], significant combinations are only four in number, as illustrated in FIG. 12. FIG. 12 indicates alternatives for the first constraint (to be applied to DCM1). To restrict the combinations to only those illustrated in FIG. 12, the condition indicated by the expression (8a) below is introduced into the mixed integer programming problem.

$$\sum_{k=1}^{4} x[1,k] = x[1,1] + x[1,2] + x[1,3] + x[1,4] = 1 \quad (8a)$$

The first constraints for DCM1 to DCM6 can be expressed by the following expressions (8a) to (8f), respectively:

$$\sum_{k=1}^{4} x[1,k] = x[1,1] + x[1,2] + x[1,3] + x[1,4] = 1 \quad (8a)$$

$$\sum_{k=1}^{3} x[2,k] = x[2,1] + x[2,2] + x[2,3] = 1 \quad (8b)$$

$$\sum_{k=1}^{5} x[3,k] = x[3,1] + x[3,2] + x[3,3] + x[3,4] + x[3,5] = 1 \quad (8c)$$

$$\sum_{k=1}^{4} x[4,k] = x[4,1] + x[4,2] + x[4,3] + x[4,4] = 1 \quad (8d)$$

$$\sum_{k=1}^{3} x[5,k] = x[5,1] + x[5,2] + x[5,3] = 1 \quad (8e)$$

$$\sum_{k=1}^{6} x[6,k] = x[6,1] + x[6,2] + x[6,3] + x[6,4] + x[6,5] + x[6,6] = 1 \quad (8f)$$

The residual dispersion rd[G,λ] appearing in the second and third constraints will be now explained. As an example, the residual dispersion rd[G,λ1] of λ1 at the node n2, which is the end point of the path p1, will be explained. The path p1 passes through fiber12 and DCM3, and thus rd[1,λ1] is equal to the sum of the dispersion amount of fiber12 and the compensation amount of DCM3. Accordingly, rd[1,λ1] of DCM3 is given by the following expression (9):

$$rd[1,\lambda 1] = d12[\lambda 1] + (c31[\lambda 1] \times [3,1] + c32[\lambda 1] \times [3,2] + c33[\lambda 1] \times [3,3] + c34[\lambda 1] \times [3,4] + c35[\lambda 1] \times [3,5]) \quad (9)$$

Using the expression (9), one expression of the second constraint for the path G=1 is derived as indicated by the following expression (10):

$$d12[\lambda 1] + c31[\lambda 1] \times [3,1] + c32[\lambda 1] \times [3,2] + c33[\lambda 1] \times [3,3] + c34[\lambda 1] \times [3,4] + c35[\lambda 1] \times [3,5] - \text{LowerBound}[1] \leq b1[1] \quad (10)$$

Modifying the expression (10) by moving the variable to the left-hand side and the constant to the right-hand side provides the following expression (10-1a):

$$c31[\lambda 1] \times [3,1] + c32[\lambda 1] \times [3,2] + c33[\lambda 1] \times [3,3] + c34[\lambda 1] \times [3,4] + c35[\lambda 1] \times [3,5] - b1[1] \leq \text{LowerBound}[1] - d12[\lambda 1] \quad (10\text{-}1a)$$

Similarly, the second constraints for all wavelengths λ1 to λ4 with respect to the first margin value b1[1] of the path p1 are derived as follows:

$$c31[\lambda 1] \times [3,1] + c32[\lambda 1] \times [3,2] + c33[\lambda 1] \times [3,3] + c34[\lambda 1] \times [3,4] + c35[\lambda 1] \times [3,5] - b1[1] \leq \text{LowerBound}[1] - d12[\lambda 1] \quad (10\text{-}1a)$$

$$c31[\lambda 2] \times [3,1] + c32[\lambda 2] \times [3,2] + c33[\lambda 2] \times [3,3] + c34[\lambda 2] \times [3,4] + c35[\lambda 2] \times [3,5] - b1[1] \leq \text{LowerBound}[1] - d12[\lambda 2] \quad (10\text{-}1b)$$

$$c31[\lambda 3] \times [3,1] + c32[\lambda 3] \times [3,2] + c33[\lambda 3] \times [3,3] + c34[\lambda 3] \times [3,4] + c35[\lambda 3] \times [3,5] - b1[1] \leq \text{LowerBound}[1] - d12[\lambda 3] \quad (10\text{-}1c)$$

$$c31[\lambda 4] \times [3,1] + c32[\lambda 4] \times [3,2] + c33[\lambda 4] \times [3,3] + c34[\lambda 4] \times [3,4] + c35[\lambda 4] \times [3,5] - b1[1] \leq \text{LowerBound}[1] - d12[\lambda 4] \quad (10\text{-}1d)$$

The above four expressions differ from each other only in the wavelength, and thus, for the other paths, only the expressions of the second constraints for λ1 will be given below.

For the path p2, the following expression is set:

$$c11[\lambda 1] \times [1,1] + c12[\lambda 1] \times [1,2] + c13[\lambda 1] \times [1,3] + c14[\lambda 1] \times [1,4] - b1[2] \leq \text{LowerBound}[2] - d21[\lambda 1] \quad (10\text{-}2a)$$

For the path p3, the following expression is set:

$$c61[\lambda 1] \times [6,1] + c62[\lambda 1] \times [6,2] + c63[\lambda 1] \times [6,3] + c64[\lambda 1] \times [6,4] + c65[\lambda 1] \times [6,5] + c66[\lambda 1] \times [6,6] - b1[3] \leq \text{LowerBound}[3] - d23[\lambda 1] \quad (10\text{-}3a)$$

For the path p4, the following expression is set:

$$c41[\lambda 1] \times [4,1] + c42[\lambda 1] \times [4,2] + c43[\lambda 1] \times [4,3] + c44[\lambda 1] \times [4,4] - b1[4] \leq \text{LowerBound}[4] - d32[\lambda 1] \quad (10\text{-}4a)$$

For the path p5, the following expression is set:

$$c21[\lambda 1] \times [2,1] + c22[\lambda 1] \times [2,2] + c23[\lambda 1] \times [2,3] - b1[5] \leq \text{LowerBound}[5] - d31[\lambda 1] \quad (10\text{-}5a)$$

For the path p6, the following expression is set:

$$c51[\lambda 1] \times [5,1] + c52[\lambda 1] \times [5,2] + c53[\lambda 1] \times [5,3] - b1[6] \leq \text{LowerBound}[6] - d13[\lambda 1] \quad (10\text{-}6a)$$

For the path p7, the following expression is set:

$$c31[\lambda 1] \times [3,1] + c32[\lambda 1] \times [3,2] + c33[\lambda 1] \times [3,3] + c34[\lambda 1] \times [3,4] + c35[\lambda 1] \times [3,5] + c61[\lambda 1] \times [6,1] + c62[\lambda 1] \times [6,2] + c63[\lambda 1] \times [6,3] + c64[\lambda 1] \times [6,4] + c65[\lambda 1] \times [6,5] + c66[\lambda 1] \times [6,6] - b1[7] \leq \text{LowerBound}[7] - d12[\lambda 1] - d23[\lambda 1] \quad (10\text{-}7a)$$

For the path p8, the following expression is set:

$$c41[\lambda 1] \times [4,1] + c42[\lambda 1] \times [4,2] + c43[\lambda 1] \times [4,3] + c44[\lambda 1] \times [4,4] + c11[\lambda 1] \times [1,1] + c12[\lambda 1] \times [1,2] + c13[\lambda 1] \times [1,3] + c14[\lambda 1] \times [1,4] - b1[8] \leq \text{LowerBound}[8] - d32[\lambda 1] - d21[\lambda 1] \quad (10\text{-}8a)$$

For the path p9, the following expression is set:

$$c61[\lambda 1] \times [6,1] + c62[\lambda 1] \times [6,2] + c63[\lambda 1] \times [6,3] + c64[\lambda 1] \times [6,4] + c65[\lambda 1] \times [6,5] + c66[\lambda 1] \times [6,6] + c21[\lambda 1] \times [2,1] + c22[\lambda 1] \times [2,2] + c23[\lambda 1] \times [2,3] - b1[9] \leq \text{LowerBound}[9] - d23[\lambda 1] - d31[\lambda 1] \quad (10\text{-}9a)$$

For the path p10, the following expression is set:

$$c51[\lambda 1] \times [5,1] + c52[\lambda 1] \times [5,2] + c53[\lambda 1] \times [5,3] + c41[\lambda 1] \times [4,1] + c42[\lambda 1] \times [4,2] + c43[\lambda 1] \times [4,3] + c44[\lambda 1] \times [4,4] - b1[10] \leq \text{LowerBound}[10] - d13[\lambda 1] - d32[\lambda 1] \quad (10\text{-}10a)$$

For the path p11, the following expression is set:

$$c21[\lambda 1] \times [2,1] + c22[\lambda 1] \times [2,2] + c23[\lambda 1] \times [2,3] + c31[\lambda 1] \times [3,1] + c32[\lambda 1] \times [3,2] + c33[\lambda 1] \times [3,3] + c34[\lambda 1] \times [3,4] + c35[\lambda 1] \times [3,5] - b1[11] \leq \text{LowerBound}[11] - d31[\lambda 1] - d12[\lambda 1] \quad (10\text{-}11a)$$

For the path p12, the following expression is set:

$$c11[\lambda 1] \times [1,1] + c12[\lambda 1] \times [1,2] + c13[\lambda 1] \times [1,3] + c14[\lambda 1] \times [1,4] + c51[\lambda 1] \times [5,1] + c52[\lambda 1] \times [5,2] + c53[\lambda 1] \times [5,3] - b1[12] \leq \text{LowerBound}[12] - d21[\lambda 1] - d13[\lambda 1] \quad (10\text{-}12a)$$

The third constraint can also be described in like manner. Regarding the third constraint for the path p1, b2[1] for λ1 can be expressed by the following inequality (11):

UpperBound[1]−(d12)[λ1]+c31[λ1]×[3,1]+c32[λ1]×[3,2]+c33[λ1]×[3,3]+c34[λ1]×[3,4]+c35[λ1]×[3,5]≦b2[1]  (11)

Modifying the expression (11) by moving the variable to the left-hand side and the constants to the right-hand side and making the direction of the inequality sign identical with that of the second constraint provides:

−c31[λ1]×[3,1]−c32[λ1]×[3,2]−c33[λ1]×[3,3]−c34[λ1]×[3,4]−c35[λ1]×[3,5]−b2[1]≦−UpperBound[1]+d12[1]  (11-1a)

Similarly, the third constraints for all wavelengths λ1 to λ4 with respect to the second margin value b2[1] of the path p1 are derived as follows:

−c31[λ1]×[3,1]−c32[λ1]×[3,2]−c33[λ1]×[3,3]−c34[λ1]×[3,4]−c35[λ1]×[3,5]−b2[1]≦−UpperBound[1]+d12[1]  (11-1a)

−c31[λ2]×[3,1]−c32[λ2]×[3,2]−c33[λ2]×[3,3]−c34[λ2]×[3,4]−c35[λ2]×[3,5]−b2[1]≦−UpperBound[1]+d12[1]  (11-1b)

−c31[λ3]×[3,1]−c32[λ3]×[3,2]−c33[λ3]×[3,3]−c34[λ3]×[3,4]−c35[λ3]×[3,5]−b2[1]≦−UpperBound[1]+d12[1]  (11-1c)

−c31[λ4]×[3,1]−c32[λ4]×[3,2]−c33[λ4]×[3,3]−c34[λ4]×[3,4]−c35[λ4]×[3,5]−b2[1]≦−UpperBound[1]+d12[1]  (11-1d)

The above four expressions differ from each other only in the wavelength, and thus, for the other paths, only the expressions of the third constraints for λ1 will be given below.

For the path p2, the following expression is set:

−c11[λ1]×[1,1]−c12[λ1]×[1,2]−c13[λ1]×[1,3]−c14[λ1]×[1,4]−b2[2]≦−UpperBound[2]+d21[λ1]  (11-2a)

For the path p3, the following expression is set:

−c61[λ1]×[6,1]−c62[λ1]×[6,2]−c63[λ1]×[6,3]−c64[λ1]×[6,4]−c65[λ1]×[6,5]−c66[λ1]×[6,6]−b2[3]≦−UpperBound[3]+d23[λ1]  (11-3a)

For the path p4, the following expression is set:

−c41[λ1]×[4,1]−c42[λ1]×[4,2]−c43[λ1]×[4,3]−c44[λ1]×[4,4]−b2[4]≦−UpperBound[4]+d32[λ1]  (11-4a)

For the path p5, the following expression is set:

−c21[λ1]×[2,1]−c22[λ1]×[2,2]−c23[λ1]×[2,3]−b2[5]≦−UpperBound[5]+d31[λ1]  (11-5a)

For the path p6, the following expression is set:

−c51[λ1]×[5,1]−c52[λ1]×[5,2]−c53[λ1]×[5,3]−b2[6]≦−UpperBound[6]+d13[λ1]  (11-6a)

For the path p7, the following expression is set:

−c31[λ1]×[3,1]−c32[λ1]×[3,2]−c33[λ1]×[3,3]−c34[λ1]×[3,4]−c35[λ1]×[3,5]−c61[λ1]×[6,1]−c62[λ1]×[6,2]−c63[λ1]×[6,3]−c64[λ1]×[6,4]−c65[λ1]×[6,5]−c66[λ1]×[6,6]−b2[7]≦−UpperBound[7]+d12[λ1]+d23[λ1]  (11-7a)

For the path p8, the following expression is set:

−c41[λ1]×[4,1]−c42[λ1]×[4,2]−c43[λ1]×[4,3]−c44[λ1]×[4,4]−c11[λ1]×[1,1]−c12[λ1]×[1,2]−c13[λ1]×[1,3]−c14[λ1]×[1,4]−b2[8]≦−UpperBound[8]+d32[λ1]+d21[λ1]  (11-8a)

For the path p9, the following expression is set:

−c61[λ1]×[6,1]−c62[λ1]×[6,2]−c63[λ1]×[6,3]−c64[λ1]×[6,4]−c65[λ1]×[6,5]−c66[λ1]×[6,6]c21[λ1]×[2,1]−c22[λ1]×[2,2]−c23[λ1]×[2,3]−b2[9]≦−UpperBound[9]+d23[λ1]+d31[λ1]  (11-9a)

For the path p10, the following expression is set:

−c51[λ1]×[5,1]−c52[λ1]×[5,2]−c53[λ1]×[5,3]−c41[λ1]×[4,1]−c42[λ1]×[4,2]−c43[λ1]×[4,3]−c44[λ1]×[4,4]−b2[10]≦−UpperBound[10]+d13[λ1]+d32[λ1]  (11-10a)

For the path p11, the following expression is set:

−c21[λ1]×[2,1]−c22[λ1]×[2,2]−c23[λ1]×[2,3]−c31[λ1]×[3,1]−c32[λ1]×[3,2]−c33[λ1]×[3,3]c34[λ1]×[3,4]−c35[λ1]×[3,5]−b2[11]≦−UpperBound[11]+d31[λ1]+d12[λ1]  (11-11a)

For the path p12, the following expression is set:

−c11[λ1]×[1,1]−c12[λ1]×[1,2]−c13[λ1]×[1,3]−c14[λ1]×[1,4]−c51[λ1]×[5,1]−c52[λ1]×[5,2]−c53[λ1]×[5,3]−b2[12]≦−UpperBound[12]+d21[λ1]+d13[λ1]  (11-12a)

Lastly, the objective function z can be expressed as follows:

$$z = \sum_{G=1}^{12} (b1[G] + b2[G])$$

$$= (b1[1] + b2[1]) + (b1[2] + b2[2]) + (b1[3] + b2[3]) +$$
$$(b1[4] + b2[4]) + (b1[5] + b2[5]) + (b1[6] + b2[6]) +$$
$$(b1[7] + b2[7]) + (b1[8] + b2[8]) + (b1[9] + b2[9]) +$$
$$(b1[10] + b2[10]) + (b1[11] + b2[11]) + (b1[12] + b2[12])$$

(12)

The calculation controller 13 derives an x[i,k] value that minimizes the expression (12) under the constraints. Thus, the dispersion compensation amount ck corresponding to x[i,k] of which the value is "1" is determined as the dispersion compensation amount of the dispersion compensation module to be arranged in the receiving-end node of fiber#i.

The concept of how a minimal solution is derived will be now explained with reference to diagrams, wherein the case of obtaining a minimal solution under the second constraint will be described separately from the case of obtaining a minimal solution under the third constraint.

Figure 13:
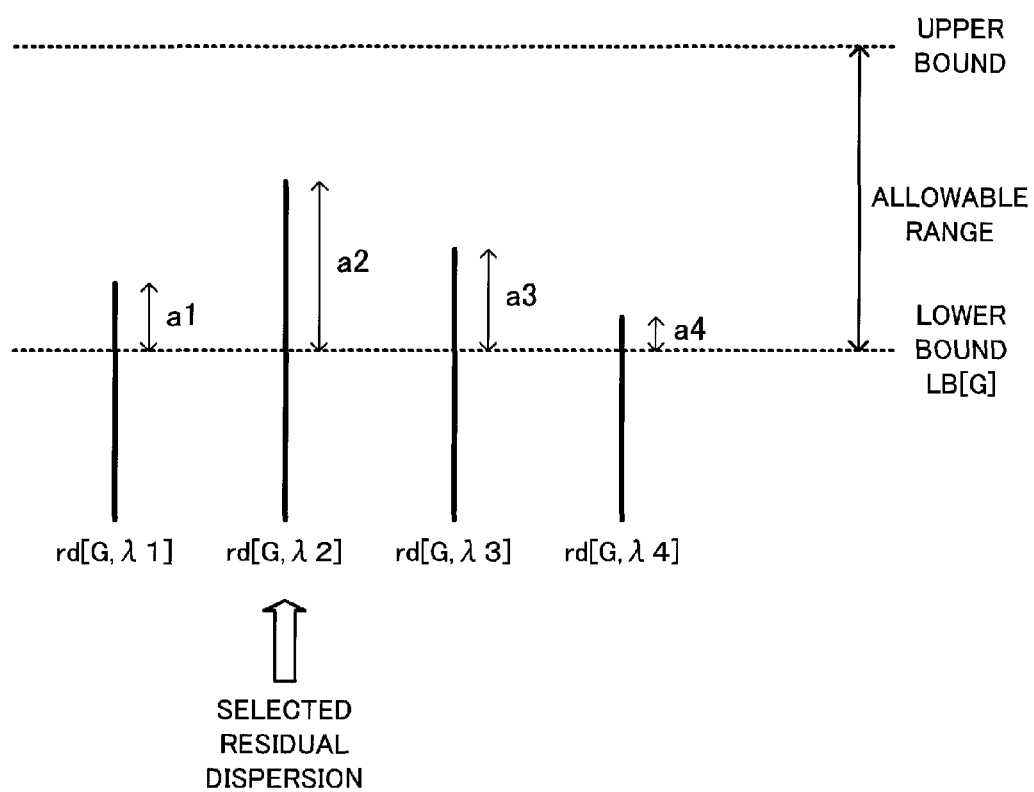
FIG. 13 illustrates a concept of how a minimal solution is derived under a second constraint.

FIG. 13 illustrates the concept of how a minimal solution is derived under the second constraint. Assuming that the four wavelengths λ1 to λ4 are propagated through the path G, residual dispersions rd[G,λ1], rd[G,λ2], rd[G,λ3] and rd[G,λ4] will be considered. Suppose that these residual dispersions have respective values (magnitude relationship) illustrated in FIG. 13, relative to the lower bound LowerBound[G] (indicated herein as "LB[G]") of the allowable range.

On the left-hand side of the aforementioned expression (2a) indicating the second constraint, the difference between the residual dispersion and the lower bound is obtained. Thus, let us suppose that rd[G,λ1]−LB[G]=a1, rd[G,λ2]−LB[G]=a2, rd[G,λ3]−LB[G]=a3 and rd[G,λ4]−LB[G]=a4, where a4<a1<a3<a2.

The relations between the first margin value b1[G] on the right-hand side of the expression (2a) and the difference values a1 to a4 are as follows: a1≦b1[G], a2≦b1[G], a3≦b1[G], and a4≦b1[G]. When b1[G]=a2, b1[G] is the smallest and at the same time satisfies the four inequalities, as seen from the magnitude relationship of the difference values a1 to a4. Namely, the value b1[G] equal to the largest difference value a2 is the minimum value that fulfills all the four inequalities. In this case, rd[G,λ2] is identified as the residual dispersion to be selected.

As is clear from FIG. 13, rd[G,λ2] is within the allowable range and also is remotest from the lower bound LB[G]. Thus, the residual dispersion rd[G,λ2] which has the smallest variation with respect to the lower bound LB[G], among rd[G,λ1] to rd[G,λ4], is selected (the fact that the residual dispersion variation relative to the lower bound is small means that the residual dispersion is remote from the lower bound of the allowable range).

Figure 14:
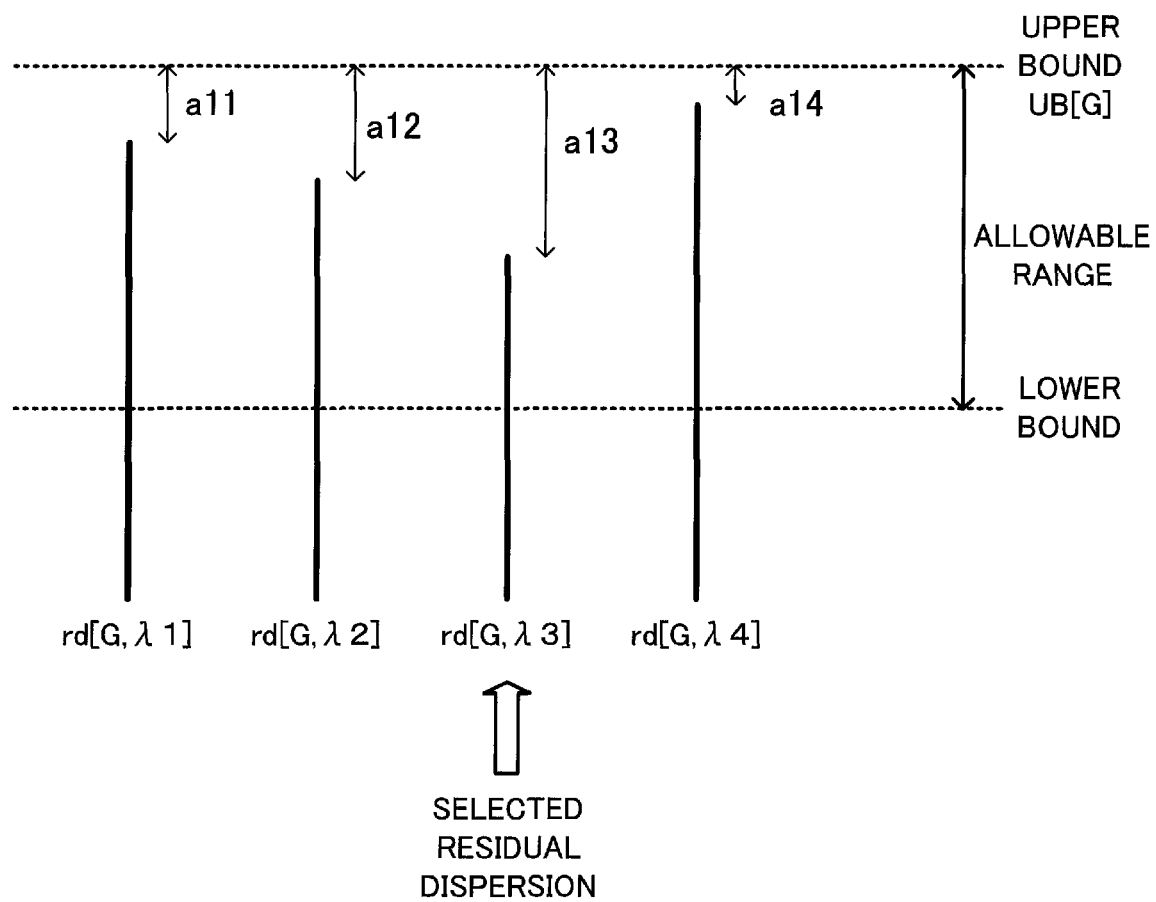
FIG. 14 illustrates a concept of how a minimal solution is derived under a third constraint.

FIG. 14 illustrates the concept of how a minimal solution is derived under the third constraint. Assuming that the four wavelengths λ1 to λ4 are propagated through the path G, residual dispersions rd[G,λ1], rd[G,λ2], rd[G,λ3] and rd[G,λ4] will be considered. Suppose that these residual dispersions have respective values (magnitude relationship) illustrated in FIG. 14, relative to the upper bound UpperBound[G] (indicated herein as "UB[G]") of the allowable range.

On the left-hand side of the aforementioned expression (3a) indicating the third constraint, the difference between the upper bound and the residual dispersion is obtained. Thus, let us suppose that UB[G]−rd[G,λ1]=a11, UB[G]−rd[G,λ2]=a12, UB[G]−rd[G,λ3]=a13, and UB[G]−rd[G,λ4]=a14, where a14<a11<a12<a13.

The relations between the second margin value b2[G] on the right-hand side of the expression (3a) and the difference values a11 to a14 are as follows: a11≦b2[G], a12≦b2[G], a13≦b2[G], and a14≦b2[G]. When b2[G]=a13, b2[G] is the smallest and at the same time satisfies the four inequalities, as seen from the magnitude relationship of the difference values a11 to a14. Namely, the value b2[G] equal to the largest difference value a13 is the minimum value that fulfills all the four inequalities. In this case, rd[G,λ3] is identified as the residual dispersion to be selected.

As is clear from FIG. 14, rd[G,λ3] is within the allowable range and also is remotest from the upper bound UB[G]. Thus, the residual dispersion rd[G,λ3] which has the smallest variation with respect to the upper bound UB[G], among rd[G,λ1] to rd[G,λ4], is selected (the fact that the residual dispersion variation relative to the upper bound is small means that the residual dispersion is remote from the upper bound of the allowable range).

As described above, in the optical network design apparatus 10, the dispersion compensation amount of each node is determined so that the residual dispersion variations of the individual wavelengths may be minimized, unlike the conventional apparatus in which a fixed variation range is set through the estimation based on the calculated residual dispersion of a single reference wavelength.

In the conventional apparatus, a fixed value is input as the variation of chromatic dispersion, and thus, it is not possible to optimize the dispersion compensation such that actual chromatic dispersion variations of the individual wavelength channels are minimized.

On the other hand, the optical network design apparatus 10 first sets, as constraints, the first margin value which assumes any value equal to or greater than the difference between the residual dispersion of each wavelength channel at the end point of each path and the lower bound of the allowable chromatic dispersion range, and the second margin value which assumes any value equal to or greater than the difference between the upper bound of the allowable range for the chromatic dispersion of each wavelength channel at the end point of each path and the residual dispersion.

The residual dispersion variation width of each wavelength can be mathematically expressed by summing up the first and second margin values. Thus, the sums of the first and second margin values of all paths are added together, and the result is included in the objective function. Then, the mixed integer programming problem is solved to find a solution that minimizes the objective function, whereby the dispersion compensation amounts of the individual nodes are determined such that the residual dispersion variations of the individual wavelengths are minimized.

Thus, the dispersion compensation amount of each node can be determined so as to minimize the residual dispersion variations of the individual wavelength channels at the end point of the path, enabling optimum design of the dispersion compensation amounts.

For the calculation of the mixed integer programming problem, commonly known methods such as cutting plane method or branch-and-bound method may be used (also, the linear programming problem and the integer programming problem may be calculated, for example, by using free software such as GLPK (GNU Linear Programming Kit).

A first modification will be now described. In the first modification, a new constraint is added when the residual dispersion rd[G,λ] of the wavelength channel λ at the end point of the path G is greater than the upper bound of the allowable range for the residual dispersion at the end point of the path G.

If the residual dispersion at the end point of the path is greater than the upper bound of the allowable range, the constraint setter 12 adds a constraint, indicated below, by using a constant b1Coef greater than "1" such that, for all wavelengths, the first margin value is equal to or greater than a value obtained by multiplying the difference between the residual dispersion and the lower bound of the allowable residual dispersion range by the constant.

if $rd[G,\lambda] > \text{UpperBound}[G]$ $$b1\text{Coef} \times (rd[G,\lambda] - \text{LowerBound}[G]) \leq b1[G] \quad (13)$$

By virtue of the constraint, if the residual dispersion rd[G,λ] of the wavelength channel λ at the end point of the path G exceeds the upper bound of the allowable range for the residual dispersion at the end point of the path G, b1[G] can be made "b1Coef" times greater than the original value. As a result, the objective function z increases correspondingly, and therefore, when the objective function z is minimized, a solution is obtained such that as few residual dispersions as possible are greater than the upper bound of the allowable range.

Thus, in accordance with the first modification, the constraint is added such that when the residual dispersion at the end point of the path is greater than the upper bound of the allowable residual dispersion range, the first margin value is multiplied by the constant, which is greater than "1", so as to be greater than the original value. Because of the additional constraint, the first margin value is increased if there is a wavelength channel whose residual dispersion at the end point of the path is greater than the upper bound of the allowable residual dispersion range, with the result that the objective function increases correspondingly. It is therefore possible to determine the dispersion compensation amounts of the individual nodes so that the number of wavelength channels whose chromatic dispersion range exceeds the upper bound of the allowable range may be minimized.

A second modification will be now described. In the second modification, a new constraint is added when the residual dispersion rd[G,λ] of the wavelength channel λ at the end point of the path G is smaller than the lower bound of the allowable range for the residual dispersion at the end point of the path G.

If the residual dispersion at the end point of the path is smaller than the lower bound of the allowable range, the constraint setter 12 adds a constraint, indicated below, by using a constant b2Coef greater than "1" such that the second margin value is equal to or greater than a value obtained by multiplying the difference between the upper bound of the allowable residual dispersion range and the residual dispersion by the constant.

if $rd[G,\lambda]$<LowerBound$[G]$ $$b2\text{Coef} \times (\text{UpperBound}[G] - rd[G,\lambda]) \leq b2[G] \tag{14}$$

Because of the constraint, if the residual dispersion rd[G,λ] of the wavelength channel λ at the end point of the path G is lower than the lower bound of the allowable range for the residual dispersion at the end point of the path G, b2[G] can be made "b2Coef" times greater than the original value. As a result, the objective function z increases correspondingly, and thus, when the objective function z is minimized, a solution is obtained such that as few residual dispersions as possible are lower than the lower bound of the allowable range.

Thus, in accordance with the second modification, the constraint is added such that when the residual dispersion at the end point of the path is lower than the lower bound of the allowable residual dispersion range, the second margin value is multiplied by the constant, which is greater than "1", so as to be greater than the original value. By virtue of the additional constraint, the second margin value is increased if there is a wavelength channel whose residual dispersion at the end point of the path is smaller than the lower bound of the allowable residual dispersion range, with the result that the objective function increases correspondingly. It is therefore possible to determine the dispersion compensation amounts of the individual nodes so that the number of wavelength channels whose chromatic dispersion range falls below the lower bound of the allowable range may be minimized.

A third modification will be now described. In the third modification, the calculation controller 13 generates the objective function as a summation, for all paths, of the product of the sum of the first and second margin values and a constant determined for each path. Provided that the objective function z is derived for G=1, . . . , h and that the constant set for the individual paths is w[G], the objective function is generated as $$z = \sum_{G=1}^{h} w[G] \times (b1[G] + b2[G]) \tag{15}$$

The constant w[G] is a weight set for each path and may be a value proportional to the number of actually used communication lines of the path. The greater the value w[G], the higher b1[G]+b2[G] is valued; therefore, it is possible to derive a solution such that paths with greater w[G] have smaller variations of the individual wavelength channels as a whole. Where the first and second modifications are applied, a solution can be derived such that paths with greater w[G] have more wavelength channels whose residual dispersion falls within the allowable range.

Thus, in the third modification, the objective function is generated as a summation, for all paths, of the product of the sum of the first and second margin values and the weight set for each path. It is therefore possible to derive a solution such that paths with greater weights have more wavelength channels whose residual dispersion falls within the allowable range.

A fourth modification will be now described. In the fourth modification, positive and negative error values are set for the path G. The constraint setter 12 additionally sets a nonnegative, positive error value and a negative error value, and then sets a fourth constraint that the positive error value is equal to or greater than the difference obtained by subtracting the first margin value from the second margin value. Specifically, provided the positive and negative error values are e1[G] and e2[G], respectively, the fourth constraint is set as follows:

$$b2[G] - b1[G] \leq e1[G] \tag{16a}$$

$$e1[G] \geq 0 \tag{16b}$$

Also, a fifth constraint that the negative error value is equal to or greater than the difference obtained by subtracting the second margin value from the first margin value is set as follows:

$$b1[G] - b2[G] \leq e2[G] \tag{17a}$$

$$e2[G] \geq 0 \tag{17b}$$

Further, the calculation controller 13 generates an objective function z which includes the fourth and fifth constraints and which also includes a summation, for all paths, of the sum of the positive and negative error values. Specifically, provided that the objective function z is derived for G=1, . . . , h and that α is a constant, the objective function is generated as:

$$z = \sum_{G=1}^{h} (b1[G] + b2[G]) + \alpha \times \left( \sum_{G=1}^{h} (e1[G] + e2[G]) \right) \tag{18a}$$

In the expression (18a), α is a constant and is used as a coefficient for adjustment such that one of b1[G]+b2[G] and e1[G]+e2[G] is more heavily weighed than the other.

Thus, in the fourth modification, the nonnegative, positive error value and the negative error value are defined, the constraint that the positive error value is equal to or greater than the difference obtained by subtracting the first margin value from the second margin value is added, the constraint that the negative error value is equal to or greater than the difference obtained by subtracting the second margin value from the first margin value is added, and the summation, for all paths, of the sum of the positive and negative error values is included in the objective function. It is therefore possible to determine the dispersion compensation amounts of the individual nodes so that the chromatic dispersion variation ranges of the individual wavelength channels may be as close to the center of the allowable range as possible.

A fifth modification will be now described. In the fifth modification, the objective function is generated as indicated below, by modifying the objective function of the fourth modification.

$$z = \sum_{G=1}^{h} (b1[G] + b2[G]) + \alpha \times \left( \sum_{G=1}^{h} w2[G] \times (e1[G] + e2[G]) \right) \tag{18b}$$

In the expression (18b), a path-associated weight w2[G] is a suitable value defined for each path and may be a value proportional to the number of actually used communication lines of the path, for example.

Thus, the sum of the positive and negative error values is multiplied by the path-associated weight, the product is summated for all paths, and the obtained result is included in the objective function. It is therefore possible to derive a solution such that paths with greater weights have their variation ranges located closer to the center of the allowable range.

Accordingly, the dispersion compensation amounts of the individual nodes can be determined in such a manner that the greater the weight of the path, the closer to the center of the allowable range the chromatic dispersion variation ranges of the individual wavelength channels are located.

A sixth modification will be now described. In the sixth modification, the objective function is generated as follows, by modifying the objective function of the fourth modification:

$$z = \sum_{G=1}^{h} w1[G] \times (b1[G] + b2[G]) + \alpha \times \left( \sum_{G=1}^{h} w2[G] \times (e1[G] + e2[G]) \right) \quad (18c)$$

In the expression (18c), path-associated weights $w1[G]$ and $w2[G]$ are suitable values defined for each path. For example, $w1[G]$ may be a value proportional to the number of wavelengths used in the path, and $w2[G]$ may be set such that greater values are assigned to those paths of which the variation ranges are nearly equal to the allowable range by nature, because of long transmission distances and the like.

Thus, in the sixth modification, the sum of the first and second margin values and the sum of the positive and negative error values are multiplied by the respective different path-associated weights so that different weights can be applied to an identical path, the individual products are summated for all paths, and the obtained results are included in the objective function.

It is therefore possible to derive a solution such that paths with greater weights have more wavelength channels whose residual dispersion falls within the allowable range or that paths with greater weights have their variation ranges located closer to the center of the allowable range.

A seventh modification will be now described. In the seventh modification, a new constraint is added if the residual dispersion $rd[G,\lambda]$ of the wavelength channel $\lambda$ at the end point of the path G exceeds the upper bound of the allowable range for the residual dispersion at the end point of the path G. The seventh modification differs from the first modification in that different constants are set for different paths (b1Coef is replaced by b1Coef[G]).

If the residual dispersion at the end point of the path is greater than the upper bound of the allowable range, the constraint setter 12 adds a constraint, indicated below, by using a constant b1Coef[G] greater than "1" such that, for all wavelengths of each path, the first margin value is equal to or greater than a value obtained by multiplying the difference between the residual dispersion and the lower bound of the allowable residual dispersion range by the constant.

if $rd[G,\lambda] > \text{UpperBound}[G]$ $$b1\text{Coef}[G] \times (rd[G,\lambda] - \text{LowerBound}[G]) \leq b1[G] \quad (19)$$

The value b1Coef[G] is a weighting constant defined for the path G. By virtue of the constraint, if the residual dispersion $rd[G,\lambda]$ of the wavelength channel $\lambda$ at the end point of the path G exceeds the upper bound of the allowable range for the residual dispersion at the end point of the path G, b1[G] can be made "b1Coef[G]" times greater than the original value.

Consequently, the objective function z increases correspondingly, and therefore, when the objective function z is minimized, a solution is obtained such that paths with greater values of b1Coef[G] have less residual dispersions that exceed the upper bound of the allowable range. The greater the value b1Coef[G], the larger extent to which the value is reflected in the objective function z; therefore, a solution is sought in order from the one by which as few residual dispersions of the path as possible exceed the upper bound of the allowable range.

Thus, in the seventh modification, the constraint is added such that when the residual dispersion at the end point of the path is greater than the upper bound of the allowable residual dispersion range, the first margin value is multiplied by the weight, which is greater than "1" and defined for each path, so as to be greater than the original value. By setting different weights for different paths, it is possible to make paths with greater importance have less residual dispersions exceeding the allowable range.

Namely, the dispersion compensation amounts of the individual nodes can be determined so that paths with higher priority may have the lesser number of wavelength channels whose chromatic dispersion variation range exceeds the upper bound of the allowable range.

An eighth modification will be now described. In the eighth modification, a new constraint is added if the residual dispersion $rd[G,\lambda]$ of the wavelength channel $\lambda$ at the end point of the path G falls below the lower bound of the allowable range for the residual dispersion at the end point of the path G. The eighth modification differs from the second modification in that different constants are set for different paths (b2Coef is replaced by b2Coef[G]).

If the residual dispersion at the end point of the path is lower than the lower bound of the allowable range, the constraint setter 12 adds a constraint, indicated below, by using a constant b2Coef[G] greater than "1" such that, for all wavelengths of each path, the second margin value is equal to or greater than a value obtained by multiplying the difference between the residual dispersion and the upper bound of the allowable residual dispersion range by the constant.

if $rd[G,\lambda] < \text{LowerBound}[G]$ $$b2\text{Coef}[G] \times (\text{UpperBound}[G] - rd[G,\lambda]) \leq b2[G] \quad (20)$$

The value b2Coef[G] is a weighting constant defined for the path G. By virtue of the constraint, if the residual dispersion $rd[G,\lambda]$ of the wavelength channel $\lambda$ at the end point of the path G falls below the lower bound of the allowable range for the residual dispersion at the end point of the path G, b2[G] can be made "b2Coef[G]" times greater than the original value.

Consequently, the objective function z increases correspondingly, and therefore, when the objective function z is minimized, a solution is obtained such that paths with greater values of b2Coef[G] have less residual dispersions that fall below the lower bound of the allowable range. The greater the value b2Coef[G], the larger extent to which the value is reflected in the objective function z; therefore, a solution is sought in order from the one by which as few residual dispersions of the path as possible fall below the lower bound of the allowable range.

Thus, in the eighth modification, the constraint is added such that when the residual dispersion at the end point of the path falls below the lower bound of the allowable residual dispersion range, the second margin value is multiplied by the weight, which is greater than "1" and defined for each path, so as to be greater than the original value. By setting different weights for different paths, it is possible to make paths with greater importance have less residual dispersions falling below the allowable range.

Namely, the dispersion compensation amounts of the individual nodes can be determined so that paths with higher priority may have the lesser number of wavelength channels whose chromatic dispersion variation range falls below the lower bound of the allowable range.

The following explains the differences between the dispersion compensation design carried out by the optical network design apparatus 10 and the dispersion compensation design carried out by the conventional method using a fixed variation range.

Figure 15:
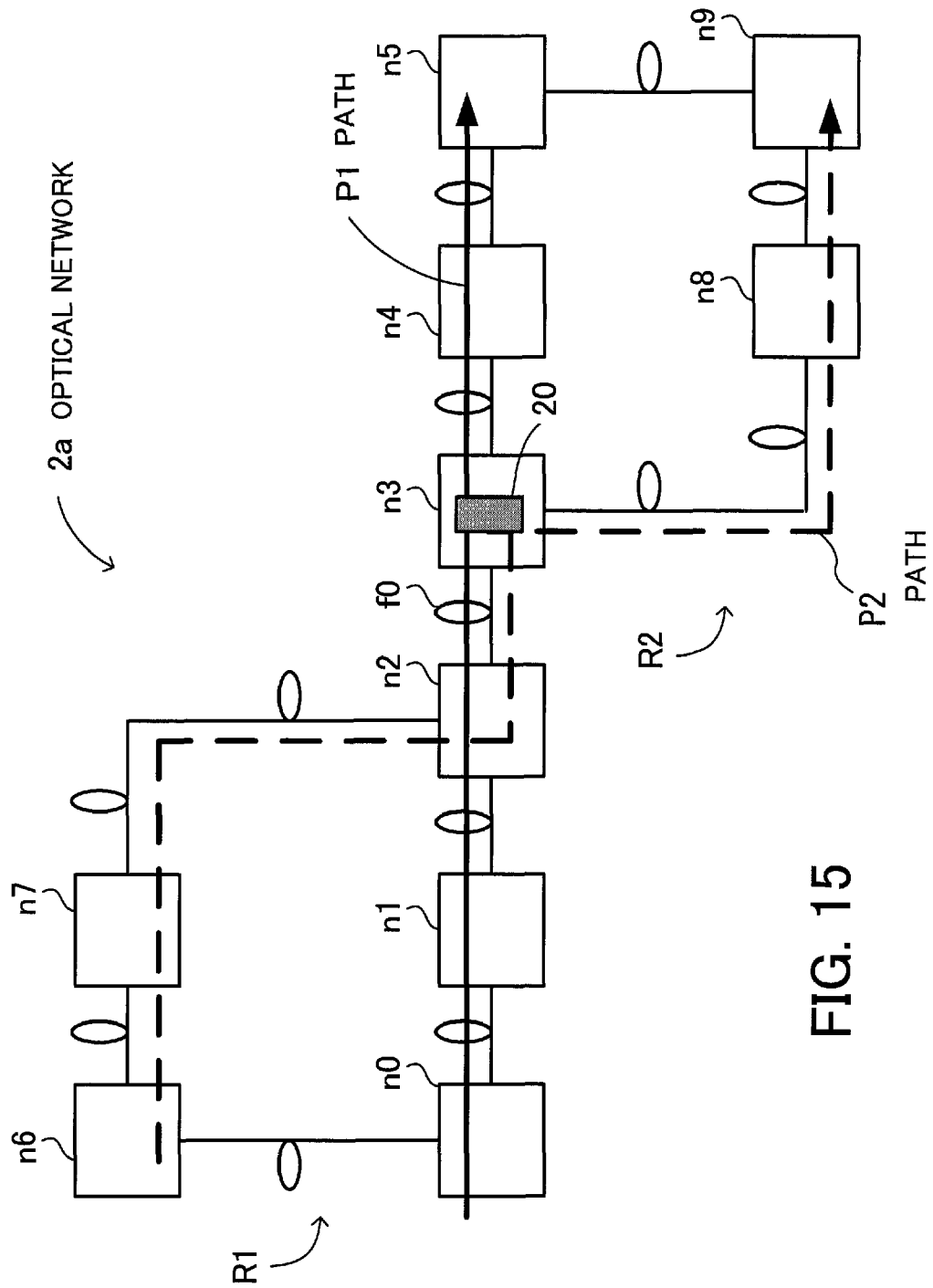
FIG. 15 illustrates an optical network with two rings connected to each other.

FIG. 15 illustrates an optical network having two rings connected to each other. The optical network 2a includes rings R1 and R2. The ring R1 is constituted by nodes n0, n1, n2, n6 and n7, and the ring R2 is constituted by nodes n3, n4, n5, n8 and n9. Also, the rings R1 and R2 are interconnected by an optical fiber f0 connecting between the nodes n2 and n3.

In the optical network 2a thus configured, there are paths whose start and end points belong to an identical ring (e.g., a path starting from the node n0 of the ring R1 and terminating at the node n2 of the same ring R1) and paths whose start and end points belong to the different rings (e.g., a path starting from the node n0 of the ring R1 and terminating at the node n5 of the ring R2).

Let it be assumed that when the compensation amounts of dispersion compensation modules to be arranged in the respective nodes of the ring R1 are determined with respect to paths of which the start and end points both belong to the ring R1, only one combination of the compensation amounts is found by which the residual dispersions of all wavelength channels of all paths can be made to fall within the allowable range. Similarly, let us suppose that when the compensation amounts of dispersion compensation modules to be arranged in the respective nodes of the ring R2 are determined with respect to paths of which the start and end points both belong to the ring R2, only one combination of the compensation amounts is found by which the residual dispersions of all wavelength channels of all paths can be made to fall within the allowable range.

In such case, no problem arises if there are no inter-ring paths such as a path having the start point in the ring R1 and the end point in the ring R2. If inter-ring paths exist, however, the dispersion compensation needs to be designed for such paths as well so that the residual dispersions may fall within the allowable range.

Let us consider paths P1 and P2 as such inter-ring paths. The path P1 starts from the node n0 and terminates at the node n5 and follows a transmission route of: n0→n1→n2→n3→n4→n5. The path P2 starts from the node n6 and terminates at the node n9 and follows a transmission route of: n6→n7→n2→n3→n8→n9. All optical fibers in the optical network 2a are individually capable of transmitting a WDM signal on which up to 40 wavelength channels are multiplexed.

Where paths such as the paths P1 and P2 exist, the dispersion compensation modules other than the dispersion compensation module 20 arranged at the receiving end of the optical fiber f0 connecting between the nodes n2 and n3 (i.e., the dispersion compensation module arranged in the node n3) fail to maintain the residual dispersion of the path section in the ring R1 or R2 within the allowable range if their compensation amounts are changed. Accordingly, the dispersion compensation module 20 arranged at the receiving end of the optical fiber between the nodes n2 and n3 is virtually the sole module whose compensation amount can be adjusted.

FIG. 16 indicates alternatives for the dispersion compensation amount of the dispersion compensation module 20. Values V1, V2 and V3 represent the respective alternatives for the compensation amount of the dispersion compensation module 20, and FIG. 16 also indicates the numbers of available wavelength channels of the paths P1 and P2 that can be used for signal transmission when the respective values V1 to V3 are set as the compensation amount of the dispersion compensation module 20 arranged in the node n3.

The available wavelength channels denote those wavelength channels of the path P1 or P2 of which the residual dispersion falls within the allowable range. For example, where the value V1 is set as the dispersion compensation amount of the dispersion compensation module 20, the residual dispersions of all wavelength channels of the path P2 fall within the allowable range, but in the case of the path P1, the residual dispersions of only six wavelength channels fall within the allowable range.

Figure 17:
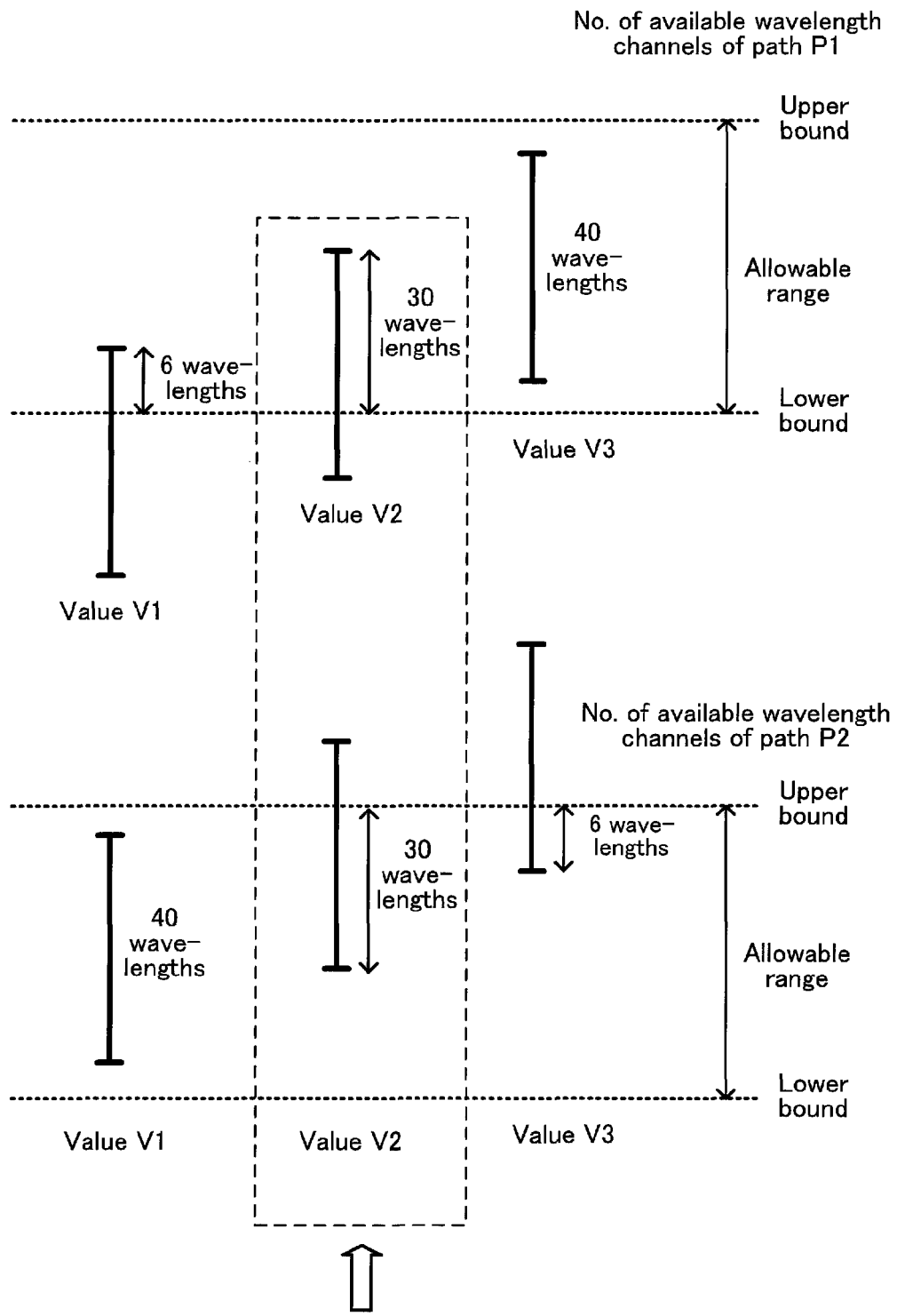
FIG. 17 illustrates transmission-available wavelength channels of paths.
Figure 18:
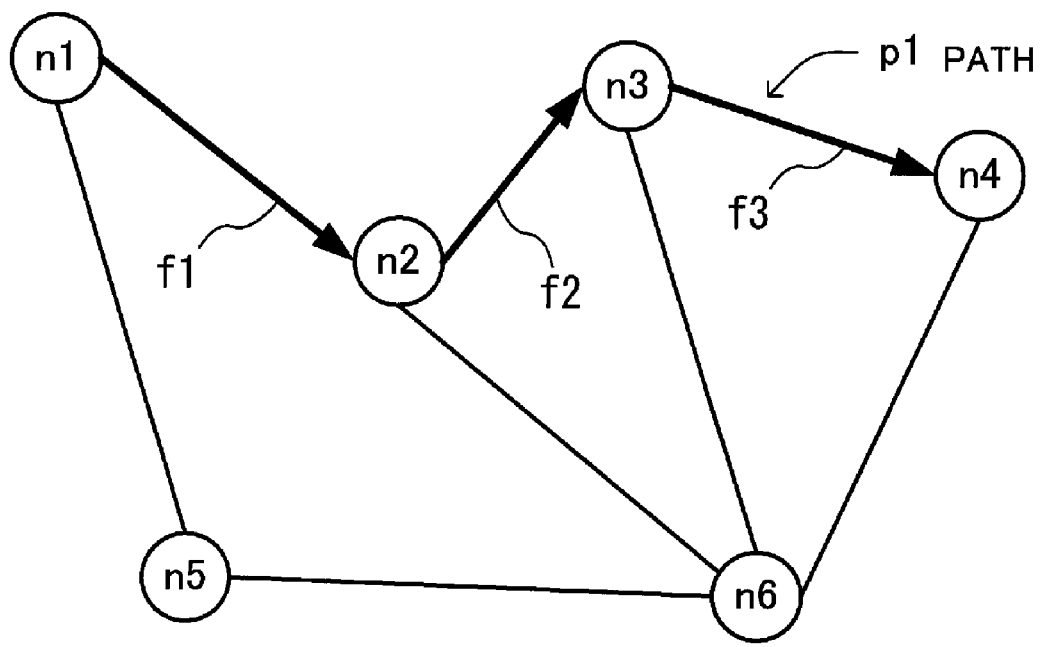
FIG. 18 illustrates a path on an optical network.
Figure 19:
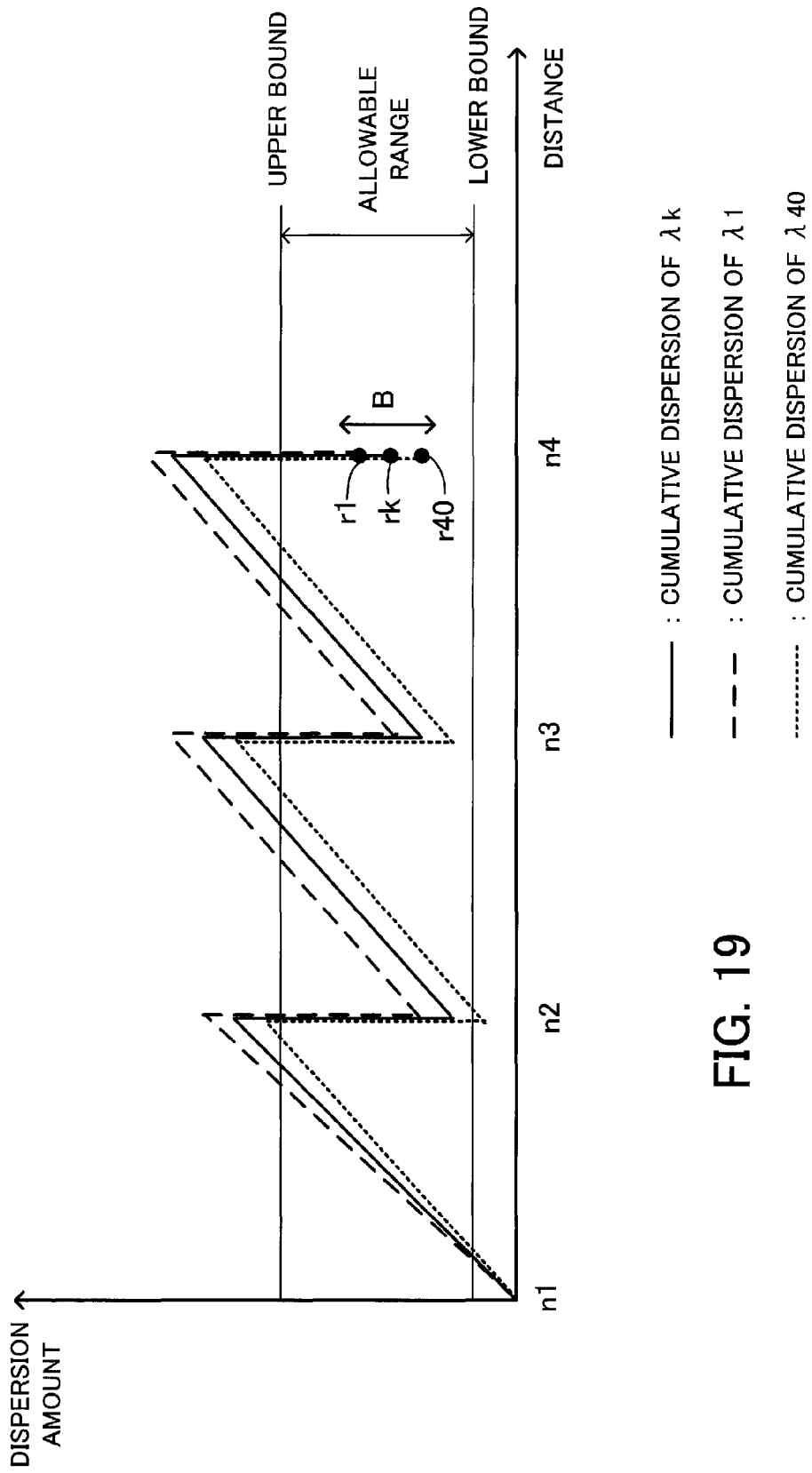
FIG. 19 illustrates a dispersion map.
Figure 20:
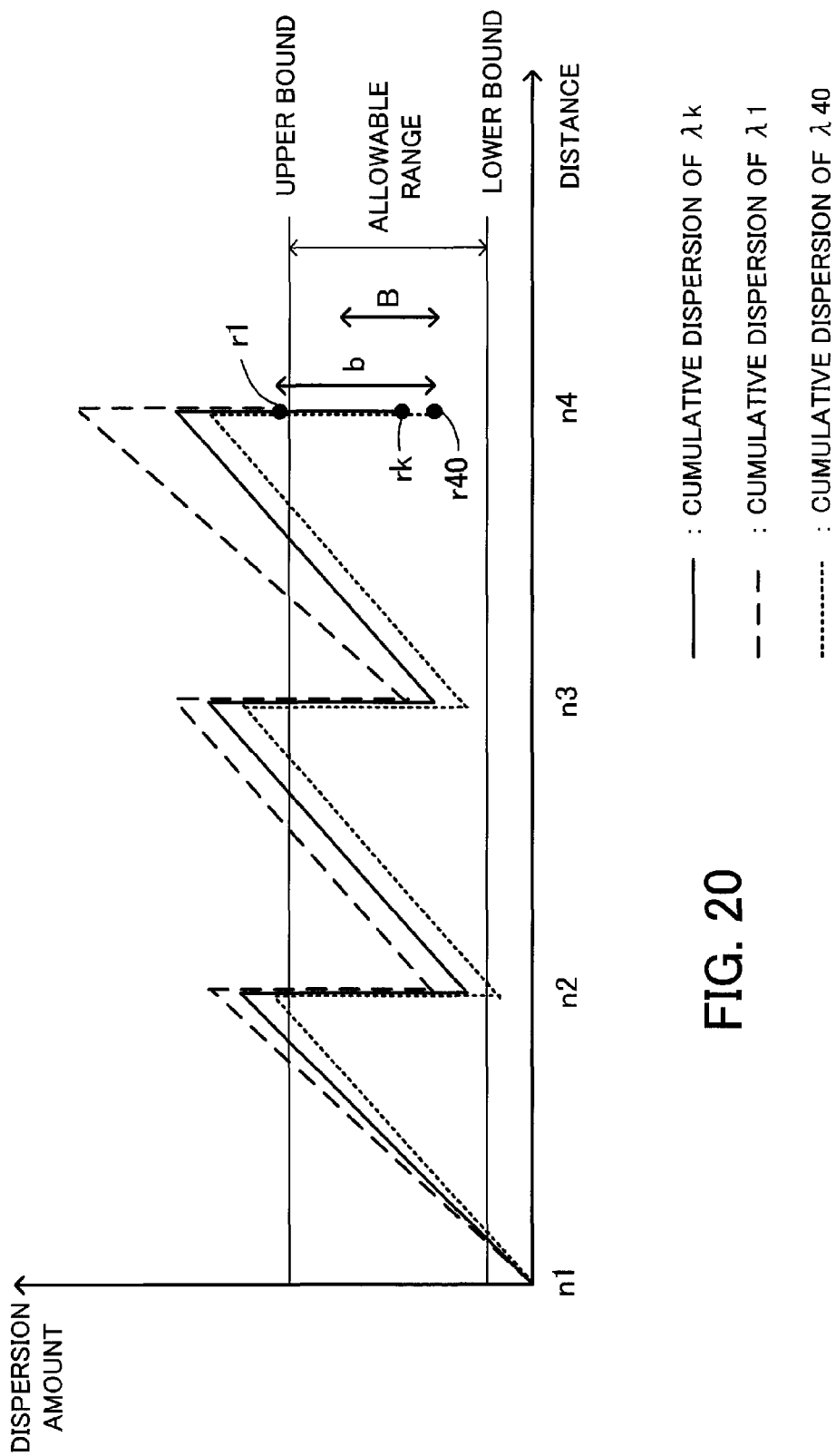
FIG. 20 illustrates another dispersion map.

FIG. 17 illustrates the available wavelength channels of the paths P1 and P2. In the case of the path P1, when the value V1 is set, the residual dispersions of six wavelengths fall within the allowable range, when the value V2 is set, the residual dispersions of 30 wavelengths fall within the allowable range, and when the value V3 is set, the residual dispersions of all the 40 wavelengths fall within the allowable range. In the case of the path P2, on the other hand, when the value V1 is set, the residual dispersions of all the 40 wavelengths fall within the allowable range, when the value V2 is set, the residual dispersions of 30 wavelengths fall within the allowable range, and when the value V3 is set, the residual dispersions of six wavelengths fall within the allowable range.

In accordance with the conventional dispersion compensation design, the dispersion compensation is designed in such a manner as to preferentially select a compensation amount alternative with which the residual dispersions of all wavelength channels fall within the allowable range. In this instance, therefore, the value V1 or V3 is selected with which the residual dispersions of all wavelength channels fall within the allowable range.

Where the value V1 is selected, however, all wavelength channels of the path P2 can be used, but in the case of the path P1, the number of the wavelength channels whose residual dispersion falls within the allowable range, that is, the number of the available wavelengths, is only six. Consequently, there arises a significant difference in the utilization rate between the paths P1 and P2, with the result that the paths P1 and P2 fail to be used at an equivalent utilization rate (this situation is very unfavorable to the users of the path P1).

Likewise, where the value V3 is selected, all wavelength channels of the path P1 can be used, but in the case of the path P2, the number of the wavelength channels whose residual dispersion falls within the allowable range, that is, the number of the available wavelengths, is only nine. Accordingly, there is a significant difference in the utilization rate between the paths P1 and P2, so that the paths P1 and P2 fail to be used at an equivalent utilization rate (the situation is very unfavorable to the users of the path P2).

On the other hand, the optical network design apparatus 10 is configured to design the dispersion compensation so that the residual dispersions of all wavelength channels of the paths P1 and P2 may fall within the allowable range, and as a consequence, the value V2 is selected.

Where the value V2 is selected, the number of the wavelength channels whose residual dispersion falls within the allowable range, that is, the number of the wavelengths available for transmission, is 30 for both of the paths P1 and P2. In this instance, therefore, the paths P1 and P2 can be used at an equivalent utilization rate. Namely, each of the paths P1 and P2 has an appropriate number of wavelength channels available for transmission.

For those wavelength channels of which the residual dispersion fails to be compensated by the dispersion compensation module 20, the optical signal may be subjected to optical/ electrical conversion at the node n2, the resulting electrical signal may be transmitted to the node n3 by an electrical cable, and the received electrical signal may be subjected to electrical/optical conversion at the node n3 to recover the optical signal for transmission.

As stated above, where an optical network has a complicated configuration, it is often the case that no matter how the compensation amounts of individual dispersion compensation modules are adjusted, some paths include wavelength channels whose residual dispersion fails to fall within the allowable range.

In such cases, the conventional design method simply selects a compensation amount with which the residual dispersions of a maximum number of wavelength channels fall within the allowable range (in the above instance, the value V1 or V3 is selected). On the other hand, with the optical network design apparatus 10, the dispersion compensation is designed so as to minimize the residual dispersion variations, with the result that the residual dispersions of the largest possible number of wavelength channels of as many paths as possible fall within the allowable range (in the above instance, the value V2 is selected).

Thus, the dispersion compensation amounts are determined so as to minimize the residual dispersion variations of the individual wavelength channels, whereby the dispersion compensation amounts can be optimally designed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions and alterations could be made hereto without departing from the spirit and scope of the invention.

What is claimed is:

1. An optical network design apparatus for designing dispersion compensation of an optical network, comprising:
   a constraint setter configured to set constraints; and
   a calculation controller configured to derive an optimal solution from an objective function including the constraints, and determine, with respect to each of nodes, a dispersion compensation amount specified by the derived solution, as the dispersion compensation amount of a dispersion compensation module to be arranged in the corresponding node, wherein:
   the constraint setter sets a first constraint that one of multiple alternative values given beforehand is selected as the dispersion compensation amount of each of the nodes,
   the constraint setter sets, with respect to each of paths, a first margin value that assumes a nonnegative value, and then sets, with respect to all wavelengths of each of the paths, a second constraint that the first margin value is equal to or greater than a difference obtained by subtracting a lower bound of an allowable residual dispersion range from a residual dispersion at an end point of the path,
   the constraint setter sets, with respect to each of the paths, a second margin value that assumes a nonnegative value, and then sets, with respect to all of the wavelengths of each of the paths, a third constraint that the second margin value is equal to or greater than a difference obtained by subtracting the residual dispersion from an upper bound of the allowable residual dispersion range at the end point of the path, and
   the calculation controller generates the objective function which includes the first, second and third constraints and which includes a summation of the first and second margin values for all of the paths, and derives the solution that minimizes the objective function.

2. The optical network design apparatus according to claim 1, wherein, provided an identification number of the dispersion compensation module arranged in each of the nodes is i, and a number of the alternative values for the dispersion compensation amount is k, where k=1, . . . , j (j is a natural number), the constraint setter sets the first constraint as $$\sum_{k=1}^{j} x[i, k] = 1$$

with respect to all i's.

3. The optical network design apparatus according to claim 1, wherein, provided an identification number of each of the paths is G, each of the wavelengths is λ, the residual dispersion at the end point of the path G is rd[G,λ], the lower bound of the allowable range for the path G is LowerBound[G], the upper bound of the allowable range for the path G is UpperBound[G], the first margin value is b1[G], and the second margin value is b2[G], the constraint setter sets the second constraint as

*rd[G,λ]*−LowerBound*[G]*≦*b1[G]*

*b1[G]*≧0 for all of the wavelengths and all of the paths, and sets the third constraint as UpperBound*[G]*−*rd[G,λ]*≦*b2[G]*

*b2[G]*≧0 for all of the wavelengths and all of the paths.

4. The optical network design apparatus according to claim 3, wherein, provided the objective function is z, and G=1, . . . , h (h is a natural number), the calculation controller generates the objection function z as $$z = \sum_{G=1}^{h} (b1[G] + b2[G]).$$

5. The optical network design apparatus according to claim 3, wherein the calculation controller further determines the wavelength λ satisfying both of expressions indicated by

*rd[G,λ]*≦UpperBound*[G]*

*rd[G,λ]*≧LowerBound*[G]*, as the wavelength to be used by the path G.

6. The optical network design apparatus according to claim 3, wherein, if the residual dispersion at the end point of the path is greater than the upper bound of the allowable range, the constraint setter adds a constraint, indicated below, by using a constant b1Coef greater than "1" such that, for all of the wavelengths, the first margin value is equal to or greater than a value obtained by multiplying the difference between the residual dispersion and the lower bound of the allowable residual dispersion range by the constant,

*b1Coef*×(*rd[G,λ]*−LowerBound*[G]*)≦*b1[G]*.

7. The optical network design apparatus according to claim 3, wherein, if the residual dispersion at the end point of the path is smaller than the lower bound of the allowable range, the constraint setter adds a constraint, indicated below, by using a constant b2Coef greater than "1" such that, for all of the wavelengths, the second margin value is equal to or greater than a value obtained by multiplying the difference between the upper bound of the allowable residual dispersion range and the residual dispersion by the constant, $b2Coef \times (UpperBound[G] - rd[G,\lambda]) \leq b2[G]$.

8. The optical network design apparatus according to claim 3, wherein the calculation controller generates the objective function as a summation, for all of the paths, of a product of a sum of the first and second margin values and a weighting constant determined for each of the paths, and provided the objective function z is derived for G=1, . . . , h and the weighting constant set for each of the paths is w[G], the objective function z is generated as $$z = \sum_{G=1}^{h} w[G] \times (b1[G] + b2[G]).$$

9. The optical network design apparatus according to claim 3, wherein the constraint setter additionally sets a nonnegative, positive error value and a negative error value, sets a fourth constraint that the positive error value is equal to or greater than a difference obtained by subtracting the first margin value from the second margin value, as $b2[G] - b1[G] \geq e1[G]$ $e1[G] \geq 0$, where e1[G] and e2[G] are the positive and negative error values, respectively, and sets a fifth constraint that the negative error value is equal to or greater than a difference obtained by subtracting the second margin value from the first margin value, as $b1[G] - b2[G] \leq e2[G]$ $e2[G] \geq 0$.

10. The optical network design apparatus according to claim 9, wherein the calculation controller generates the objective function z which includes the fourth and fifth constraints and which includes a summation, for all of the paths, of a sum of the positive and negative error values, and provided the objective function z is derived for G=1, . . . , h and α is a constant, the objective function z is generated as:

$$z = \sum_{G=1}^{h} (b1[G] + b2[G]) + \alpha \times \left( \sum_{G=1}^{h} (e1[G] + e2[G]) \right).$$

11. The optical network design apparatus according to claim 9, wherein the calculation controller generates the objective function z which includes the fourth and fifth constraints and which includes a summation of a product of a sum of the positive and negative error values and a weighting constant determined for each of the paths, and provided the objective function z is derived for G=1, . . . , h, α is a constant, and w2[G] is the weighting constant set for each of the paths, the objective function z is generated as:

$$z = \sum_{G=1}^{h} (b1[G] + b2[G]) + \alpha \times \left( \sum_{G=1}^{h} w2[G] \times (e1[G] + e2[G]) \right).$$

12. The optical network design apparatus according to claim 9, wherein the calculation controller generates the objective function z which includes a summation of a product of a sum of the first and second margin values and a first weighting constant determined for each of the paths, which includes the fourth and fifth constraints and which includes a summation of a product of a sum of the positive and negative error values and a second weighting constant determined for each of the paths, and provided the objective function z is derived for G=1, . . . , h, α is a constant, and w1[G] and w2[G] are the first and second weighting constants set for each of the paths, respectively, the objective function z is generated as:

$$z = \sum_{G=1}^{h} w1[G] \times (b1[G] + b2[G]) + \alpha \times \left( \sum_{G=1}^{h} w2[G] \times (e1[G] + e2[G]) \right).$$

13. The optical network design apparatus according to claim 3, wherein, if the residual dispersion at the end point of the path is greater than the upper bound of the allowable range, the constraint setter adds a constraint, indicated below, by using a constant b1Coef[G] greater than "1" such that, for all of the wavelengths of each of the paths, the first margin value is equal to or greater than a value obtained by multiplying the difference between the residual dispersion and the lower bound of the allowable residual dispersion range by the constant, $b1Coef[G] \times (rd[G,\lambda] - LowerBound[G]) \leq b1[G]$.

14. The optical network design apparatus according to claim 3, wherein, if the residual dispersion at the end point of the path is smaller than the lower bound of the allowable range, the constraint setter adds a constraint, indicated below, by using a constant b2Coef[G] greater than "1" such that, for all of the wavelengths of each of the paths, the second margin value is equal to or greater than a value obtained by multiplying the difference between the upper bound of the allowable residual dispersion range and the residual dispersion by the constant, $b2Coef[G] \times (UpperBound[G] - rd[G,\lambda]) \leq b2[G]$.

15. A dispersion compensation design method for designing dispersion compensation of an optical network, comprising:
  setting a first constraint that one of multiple alternative values given beforehand is selected as a dispersion compensation amount for each of nodes;
  setting, with respect to each of paths, a first margin value that assumes a nonnegative value, and setting, with respect to all wavelengths of each of the paths, a second constraint that the first margin value is equal to or greater than a difference obtained by subtracting a lower bound of an allowable residual dispersion range from a residual dispersion at an end point of the path;
  setting, with respect to each of the paths, a second margin value that assumes a nonnegative value, and setting, with respect to all of the wavelengths of each of the paths, a third constraint that the second margin value is equal to or greater than a difference obtained by subtracting the residual dispersion from an upper bound of the allowable residual dispersion range at the end point of the path;

generating an objective function which includes the first, second and third constraints and which includes a summation of the first and second margin values for all of the paths, and deriving a solution that minimizes the objective function; and determining, with respect to each of the nodes, a dispersion compensation amount specified by the derived solution, as the dispersion compensation amount of a dispersion compensation module to be arranged in the corresponding node.

16. The dispersion compensation design method according to claim 15, wherein, provided an identification number of the dispersion compensation module arranged in each of the nodes is i, and a number of the alternative values for the dispersion compensation amount is k, where k=1, ..., j (j is a natural number), the first constraint is set as $$\sum_{k=1}^{j} x[i,k] = 1$$

with respect to all i's.

17. The dispersion compensation design method according to claim 15, wherein, provided an identification number of each of the paths is G, each of the wavelengths is λ, the residual dispersion at the end point of the path G is rd[G,λ], the lower bound of the allowable range for the path G is LowerBound[G], the upper bound of the allowable range for the path G is UpperBound[G], the first margin value is b1[G], and the second margin value is b2[G], the second constraint is set as $$rd[G,\lambda] - \text{LowerBound}[G] \leq b1[G]$$

$$b1[G] \geq 0$$

for all of the wavelengths and all of the paths, and the third constraint is set as $$\text{UpperBound}[G] - rd[G,\lambda] \leq b2[G]$$

$$b2[G] \geq 0$$

for all of the wavelengths and all of the paths.

18. The dispersion compensation design method according to claim 17, wherein, provided the objective function is z, and G=1, ..., h (h is a natural number), the objection function z is generated as $$z = \sum_{G=1}^{h} (b1[G] + b2[G]).$$

19. The dispersion compensation design method according to claim 17, wherein the wavelength λ satisfying both of expressions indicated by $$rd[G,\lambda] \leq \text{UpperBound}[G]$$

$$rd[G,\lambda] \geq \text{LowerBound}[G],$$

is determined as the wavelength to be used by the path G.

* * * * *